United States Patent
Sugita et al.

(10) Patent No.: US 10,366,533 B2
(45) Date of Patent: Jul. 30, 2019

(54) IMAGE PROCESSING DEVICE AND IMAGE PROCESSING METHOD

(71) Applicant: KABUSHIKI KAISHA TOSHIBA, Minato-ku, Tokyo (JP)

(72) Inventors: Kaoru Sugita, Tokyo (JP); Masashi Nishiyama, Kanagawa (JP); Masahiro Sekine, Tokyo (JP); Hidetaka Ohira, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 88 days.

(21) Appl. No.: 15/420,545

(22) Filed: Jan. 31, 2017

(65) Prior Publication Data

US 2017/0140574 A1    May 18, 2017

Related U.S. Application Data

(63) Continuation of application No. PCT/JP2015/058542, filed on Mar. 20, 2015.

(51) Int. Cl.
  *G06T 17/20* (2006.01)
  *G06T 19/00* (2011.01)
  *G06T 19/20* (2011.01)

(52) U.S. Cl.
  CPC ............ *G06T 17/20* (2013.01); *G06T 19/00* (2013.01); *G06T 19/006* (2013.01); *G06T 19/20* (2013.01);
  (Continued)

(58) Field of Classification Search
  None
  See application file for complete search history.

(56) References Cited

U.S. PATENT DOCUMENTS

| 5,850,222 A * | 12/1998 | Cone ........................ G06T 17/20 345/418 |
| 2006/0202986 A1 * | 9/2006 | Okada ................. G06F 17/5009 345/419 |

(Continued)

FOREIGN PATENT DOCUMENTS

| JP | 09-044556 | 2/1997 |
| JP | 2003-221718 | 8/2003 |

(Continued)

OTHER PUBLICATIONS

International Search Report and Written Opinion for PCT/JP2015/058542, dated Jun. 16, 2015, 12 pages.

(Continued)

*Primary Examiner* — Andrew G Yang
(74) *Attorney, Agent, or Firm* — Nixon & Vanderhye, P.C.

(57) ABSTRACT

According to one embodiment, an image processing device includes at least one processor. The at least one processor is configured to acquire a first three-dimensional model regarding a subject, set a plurality of first control points on the first three-dimensional model, acquire mesh data of a meshed image of a region of clothing extracted from a captured image, acquire a second three-dimensional model, modify the mesh data based on an amount of movement from each of the plurality of first control points, to each respective one of a plurality of second control points, and generate an image of the clothing using the captured image and the modified mesh data.

10 Claims, 19 Drawing Sheets

(52) U.S. Cl.
CPC ...... *G06T 2200/04* (2013.01); *G06T 2200/08* (2013.01); *G06T 2210/16* (2013.01); *G06T 2219/2021* (2013.01)

(56) References Cited

U.S. PATENT DOCUMENTS

| | | | |
|---|---|---|---|
| 2013/0215116 A1* | 8/2013 | Siddique | G06Q 30/0643 345/420 |
| 2014/0118396 A1 | 5/2014 | Sugita et al. | |
| 2014/0168217 A1 | 6/2014 | Kim et al. | |
| 2014/0333614 A1* | 11/2014 | Black | G06F 17/5009 345/419 |
| 2015/0084955 A1* | 3/2015 | Chen | G06T 17/00 345/420 |
| 2015/0287242 A1* | 10/2015 | Kim | G06T 17/20 345/420 |
| 2017/0140578 A1* | 5/2017 | Xiao | G06T 17/00 |

FOREIGN PATENT DOCUMENTS

| | | |
|---|---|---|
| JP | 2005-122558 | 5/2005 |
| JP | 2007-004718 | 1/2007 |
| JP | 2011-180790 | 9/2011 |
| JP | 2013-190974 | 9/2013 |
| JP | 2014-089665 | 5/2014 |

OTHER PUBLICATIONS

Schaefer et al., "Image Deformation Using Moving Least Squares," SIGGRAPH '06 ACM SIGGRAPH 2006 Papers, Jul. 31, 2006, pp. 533-540.

Okabe, "Interactive Image Deformation Using Moving Least Squares Method," Computer Graphics Gems JP 2012, Aug. 2012, pp. 145-164.

Sugita et al., "Jinbutsu Silhouette eno Jikukan Ichi Awase ni yoru Ifuku Gazo no Gosei," The Transactions of the Institute of Electronics, Information and Communication Engineers D (vol. J97-D, No. 9), Sep. 1, 2014, pp. 1519-1527.

Sekine et al., "Jinbutsu Rinkaku o Mochiita Fit-kan no Takai Kaso Shichaku Muke Ifuku Gazo Gosei," SSII2013, Dai 19 Kai Symposium on Sensing via Image Information Koen Ronbunshu, Jun. 12, 2013, pp. (ISI-12-1)-(ISI-12-6).

Sekine et al., "Virtual Fitting by Single-shot Body Shape Estimation," Proceedings of 3D Body Scanning Technologies, Oct. 2014, pp. 406-413.

* cited by examiner

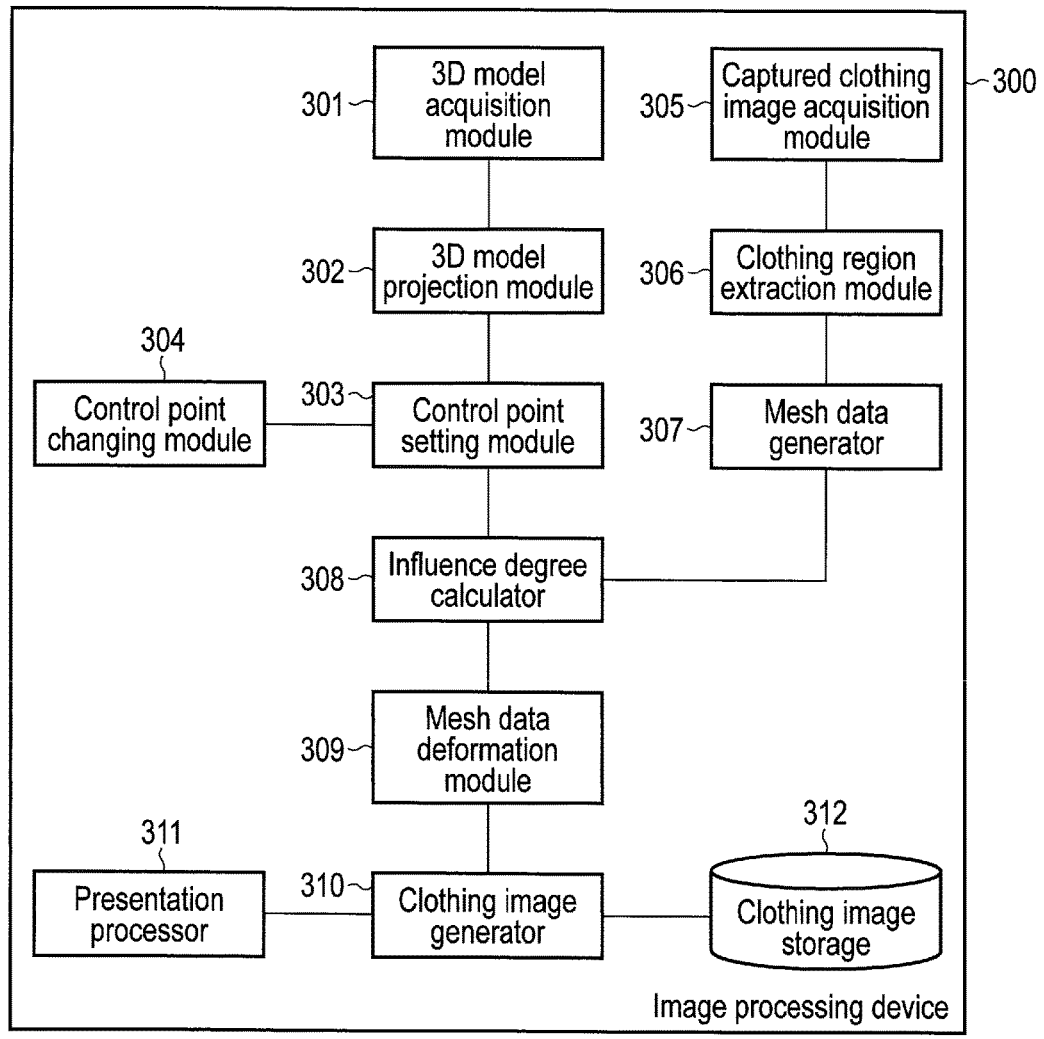
F I G. 3

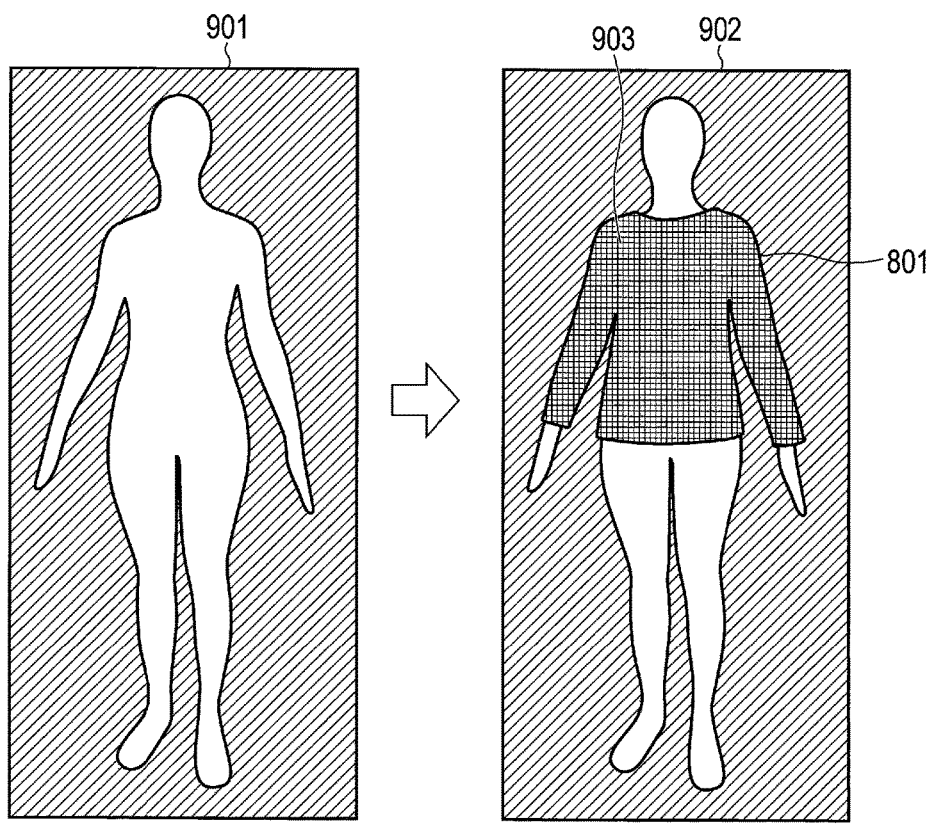
F I G. 10

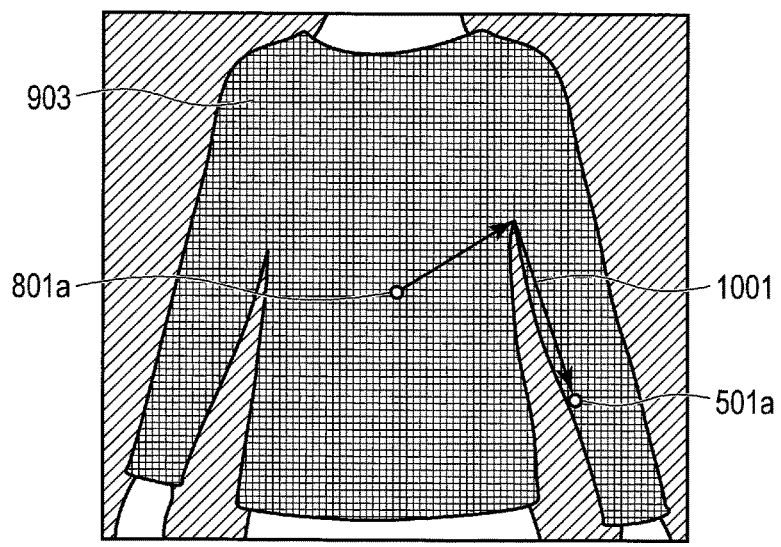
F I G. 11
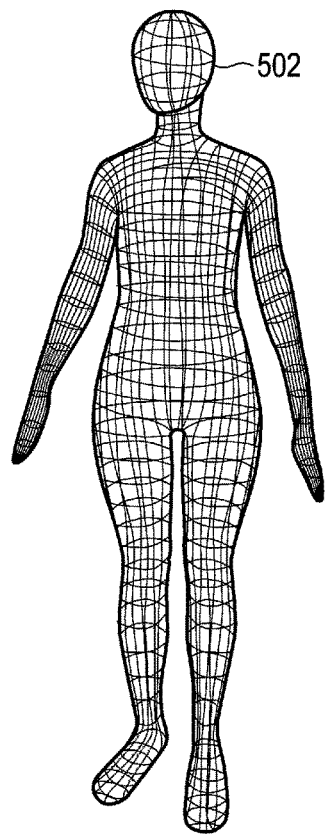
F I G. 12

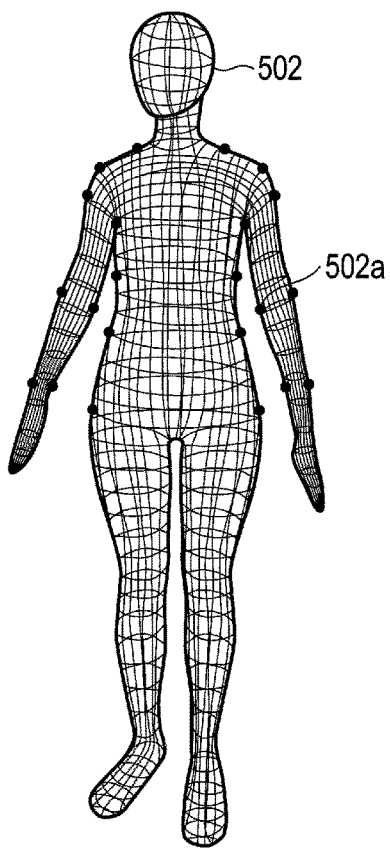
F I G. 13
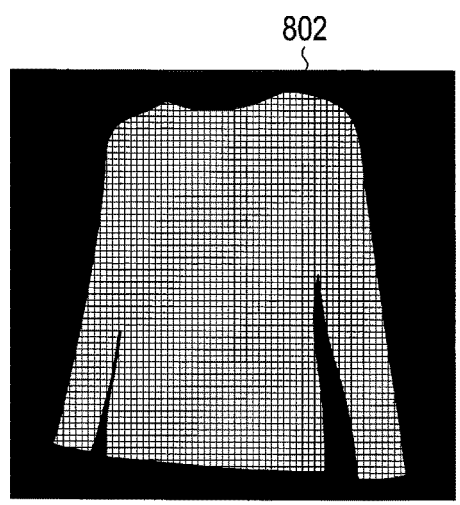
F I G. 14

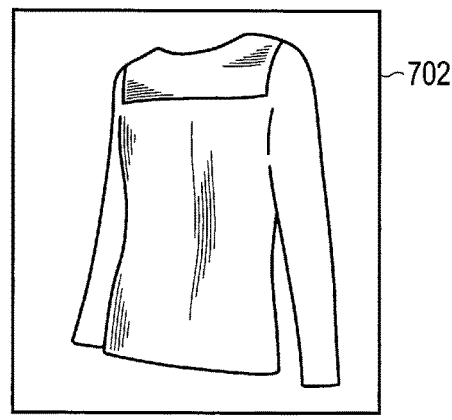
F I G. 15
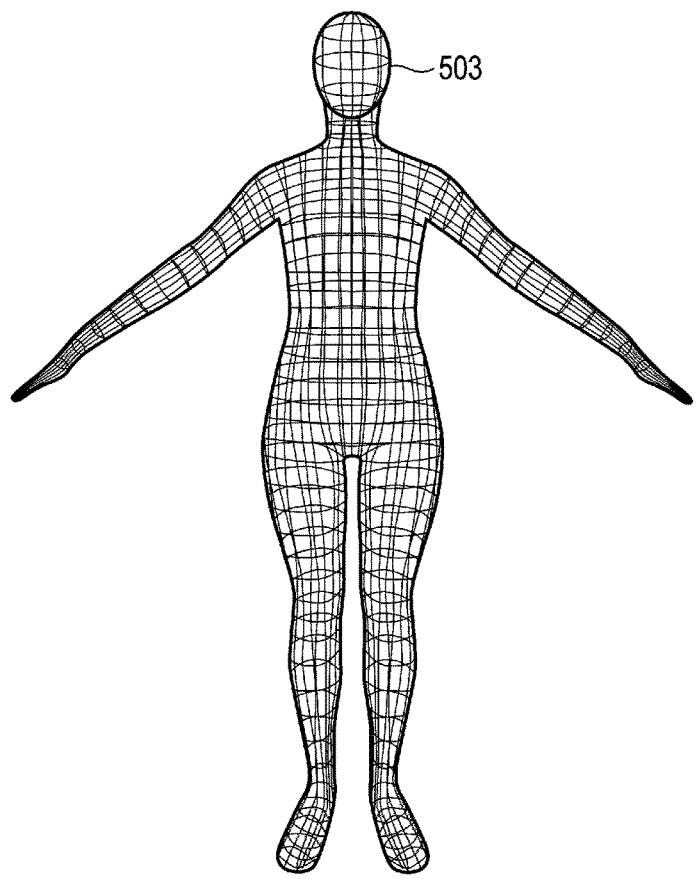
F I G. 16

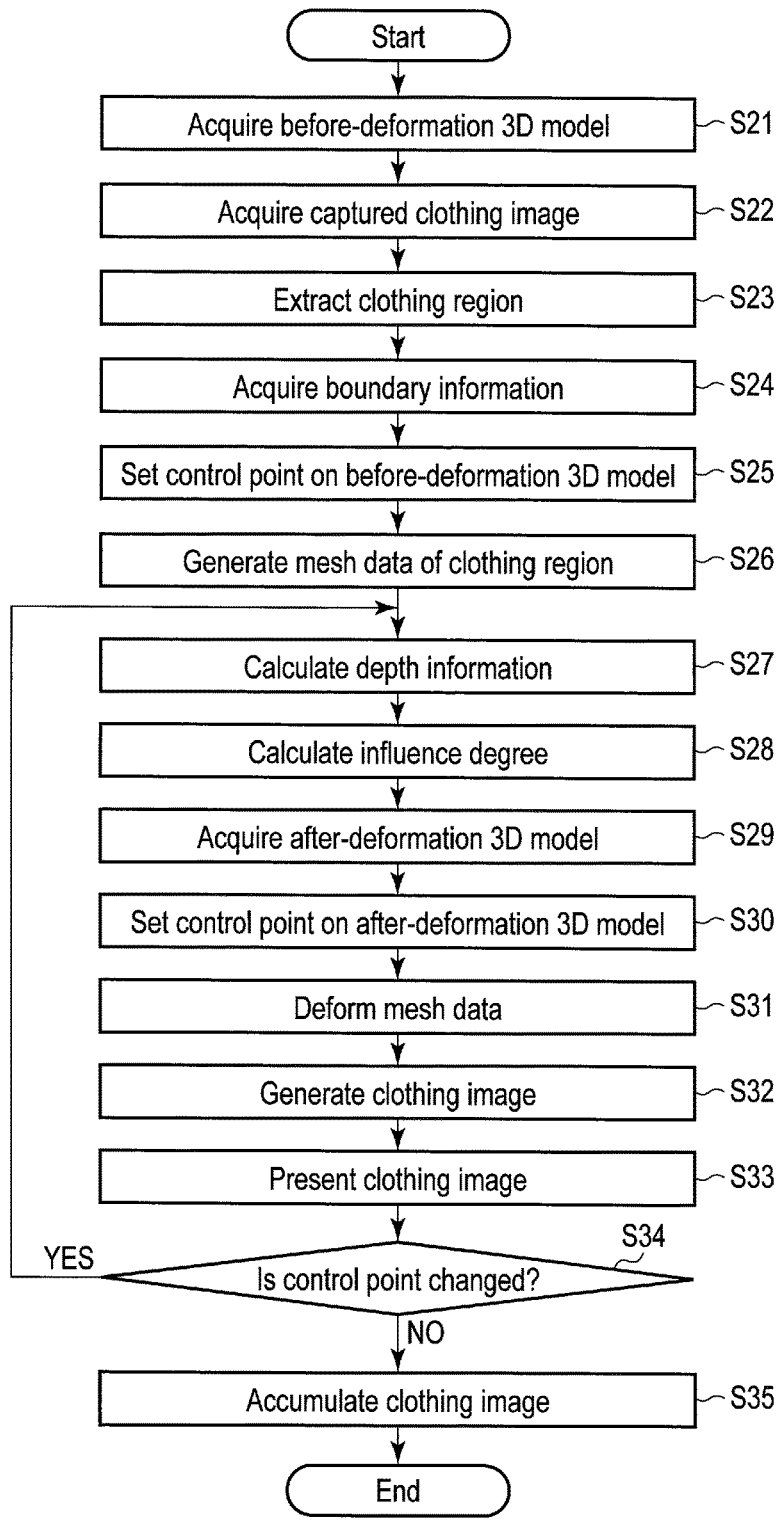
F I G. 18

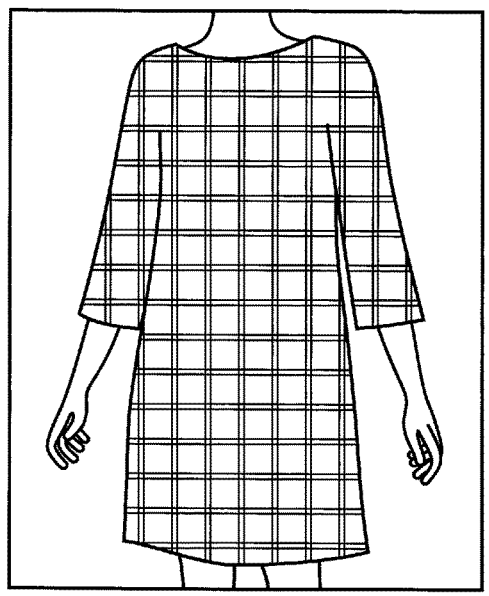
F I G. 19
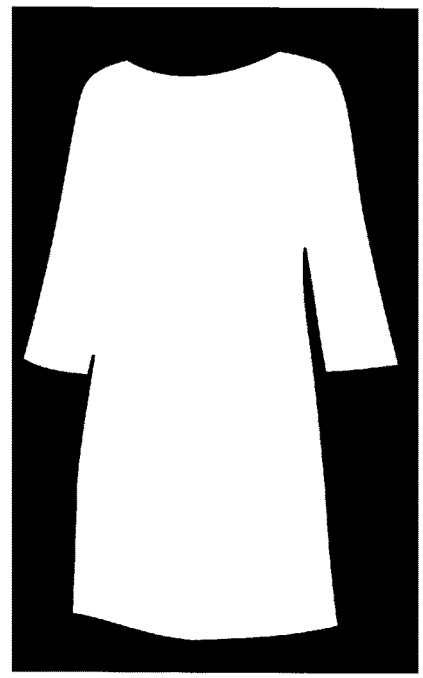
F I G. 20

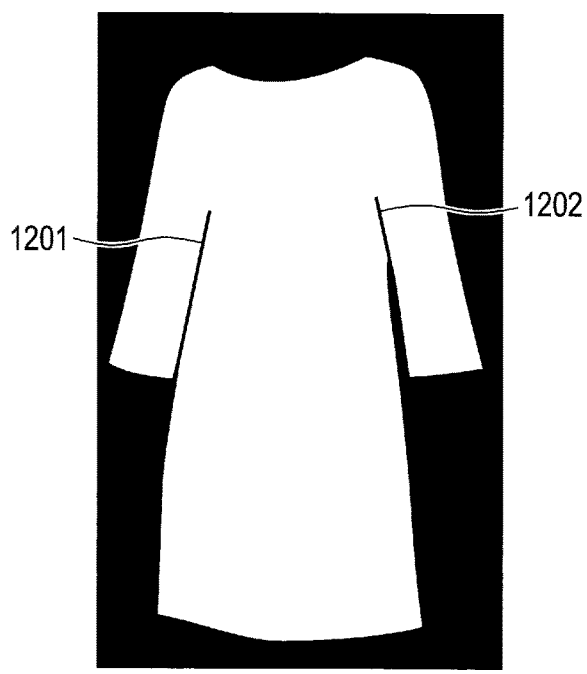
F I G. 21
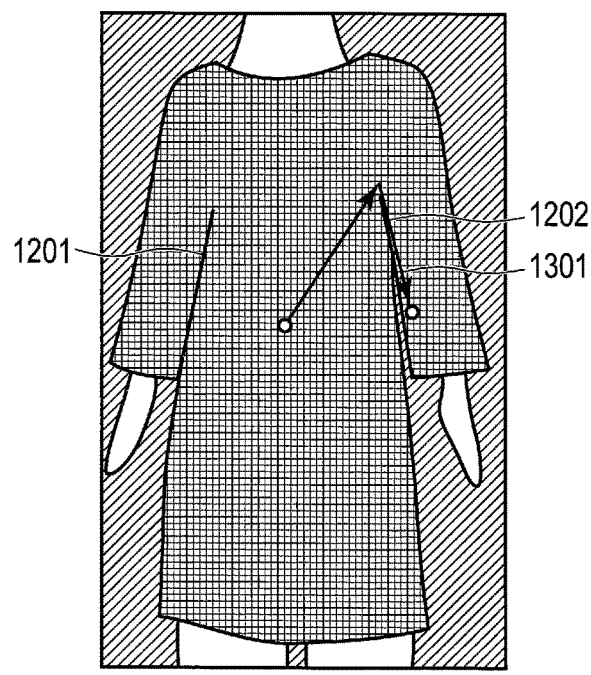
F I G. 22

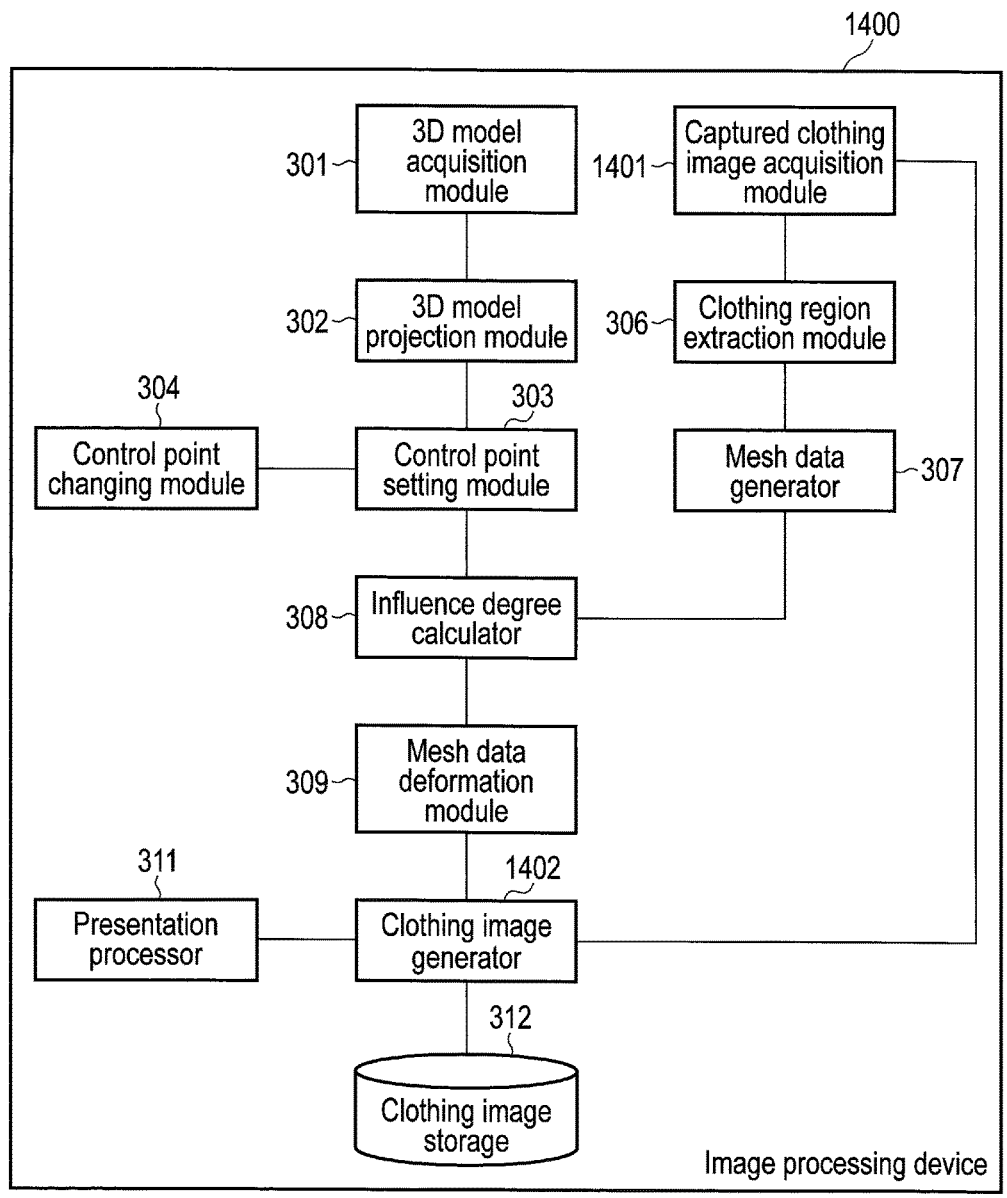
F I G. 23

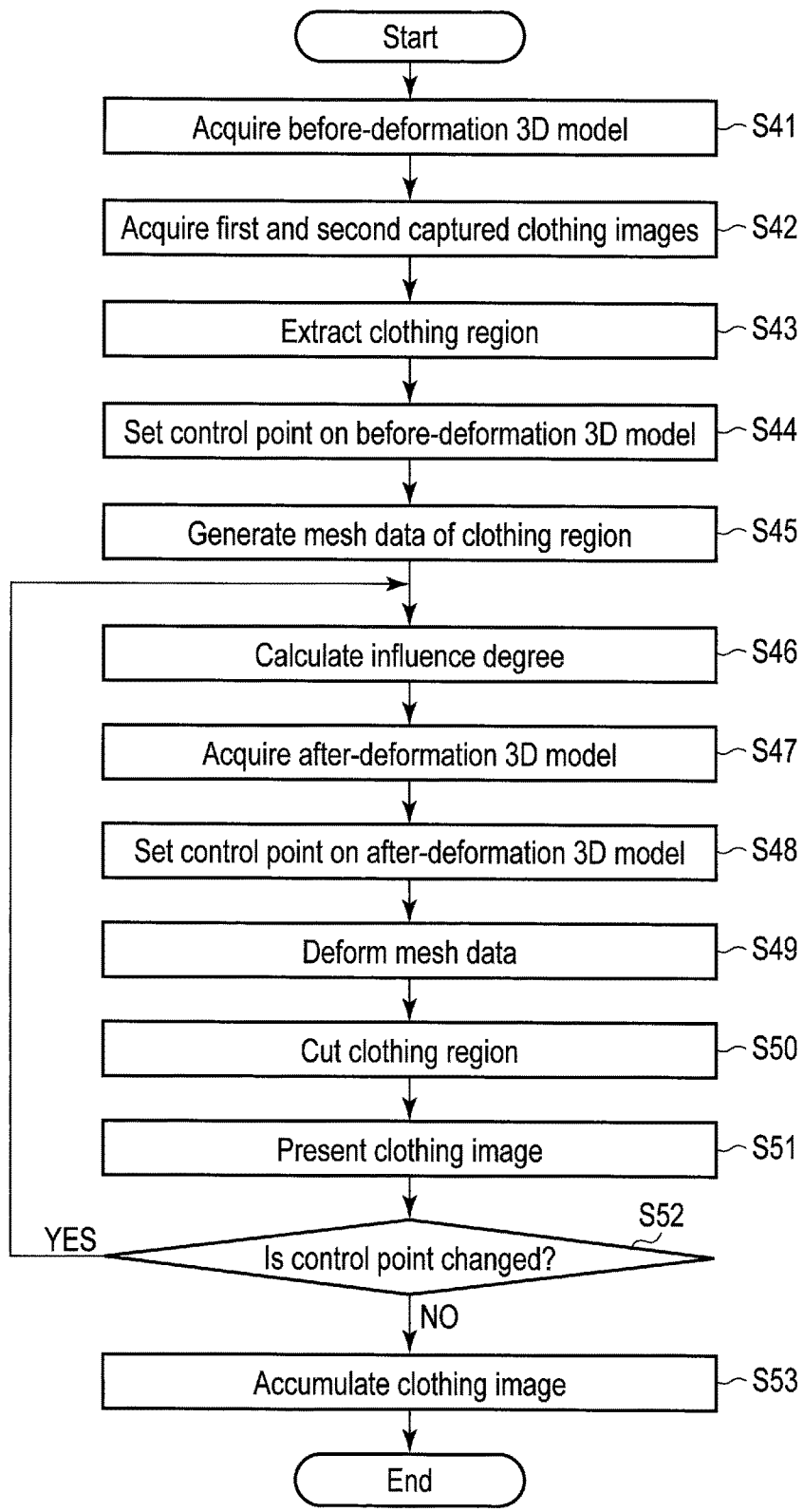
F I G. 24

IMAGE PROCESSING DEVICE AND IMAGE PROCESSING METHOD

CROSS-REFERENCE TO RELATED APPLICATIONS

This application is a Continuation application of PCT Application No. PCT/JP2015/058542, filed Mar. 20, 2015, the entire contents of which are incorporated herein by reference.

FIELD

Embodiments described herein relate generally to an image processing device.

BACKGROUND

In recent years, there is disclosed a technique to acquire, for example, a three-dimensional shape and a texture map (hereinafter, referred to as 3D CG model) by scanning a whole body using a range finder.

According to this technique, the 3D CG model of a clothing part can be generated by scanning a subject (for example, a mannequin) wearing clothing. In a case where the 3D CG model of the clothing part thus generated is synthesized with an image containing a user and displayed, it is possible to encourage the user to virtually try on (hereinafter, referred to as virtual try-on) the clothing without trying on an actual clothing.

By the way, states (direction, posture, and body type) of the user who performs the virtual try-on are various. Therefore, it is desirable that the 3D CG model be generated in accordance with the respective states of the user. However, it is difficult to prepare all the 3D CG models from the viewpoint of costs and time for generating the 3D CG models.

BRIEF DESCRIPTION OF THE DRAWINGS

FIG. 3 is a block diagram illustrating an exemplary functional configuration of an image processing device.

FIG. 10 is a diagram for describing a process when an influence degree is calculated.

FIG. 11 is a diagram for describing an example of a distance between a target control point and a target vertex which is calculated as the influence degree.

FIG. 12 is a diagram illustrating an example of an after-deformation 3D model.

FIG. 13 is a diagram illustrating exemplary control points which are set on the after-deformation 3D model.

FIG. 14 is a diagram illustrating an example of after-deformation mesh data.

FIG. 15 is a diagram illustrating an exemplary clothing image which is generated by a clothing image generator.

FIG. 16 is a diagram illustrating an example of the after-deformation 3D model in which the positions of arms are changed.

FIG. 18 is a flowchart illustrating an exemplary processing procedure of the image processing device.

FIG. 19 is a diagram illustrating an exemplary captured clothing image.

FIG. 20 is a diagram illustrating an exemplary clothing region.

FIG. 21 is a diagram for describing an example of boundary information.

FIG. 22 is a diagram for describing an example of a distance between a vertex and the control point which is calculated as the influence degree.

FIG. 23 is a block diagram illustrating an exemplary functional configuration of an image processing device according to a third embodiment.

FIG. 24 is a flowchart illustrating an exemplary processing procedure of the image processing device.

DETAILED DESCRIPTION

Various embodiments will be described hereinafter with reference to the accompanying drawings.

In general, according to one embodiment, an image processing device includes at least one processor. The at least one processor is configured to: acquire a first three-dimensional model regarding a subject; set a plurality of first control points on the first three-dimensional model; acquire mesh data of a meshed image of a region of clothing extracted from a captured image containing the subject wearing the clothing; acquire a second three-dimensional model by modifying the first three-dimensional model; modify the mesh data based on an amount of movement from each of the plurality of first control points set on the first three-dimensional model, to each respective one of a plurality of second control points on the second three-dimensional model, respectively corresponding to the plurality of first control points; and generate an image of the clothing using the captured image and the modified mesh data.

First Embodiment

Figure 1:
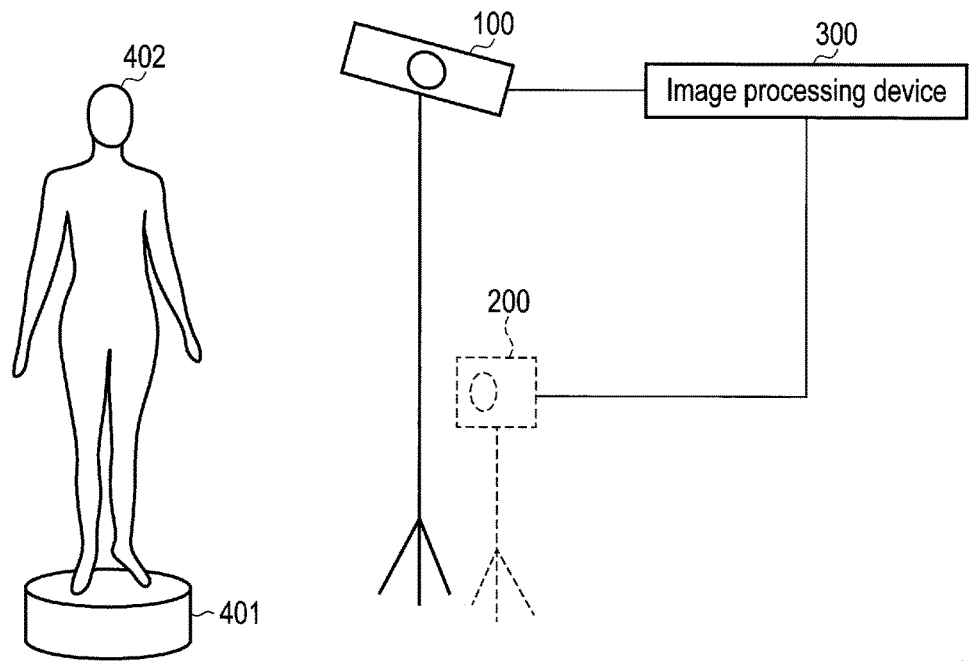
FIG. 1 is a diagram for describing an example of a configuration of an image processing system in a first embodiment.
Figure 2:
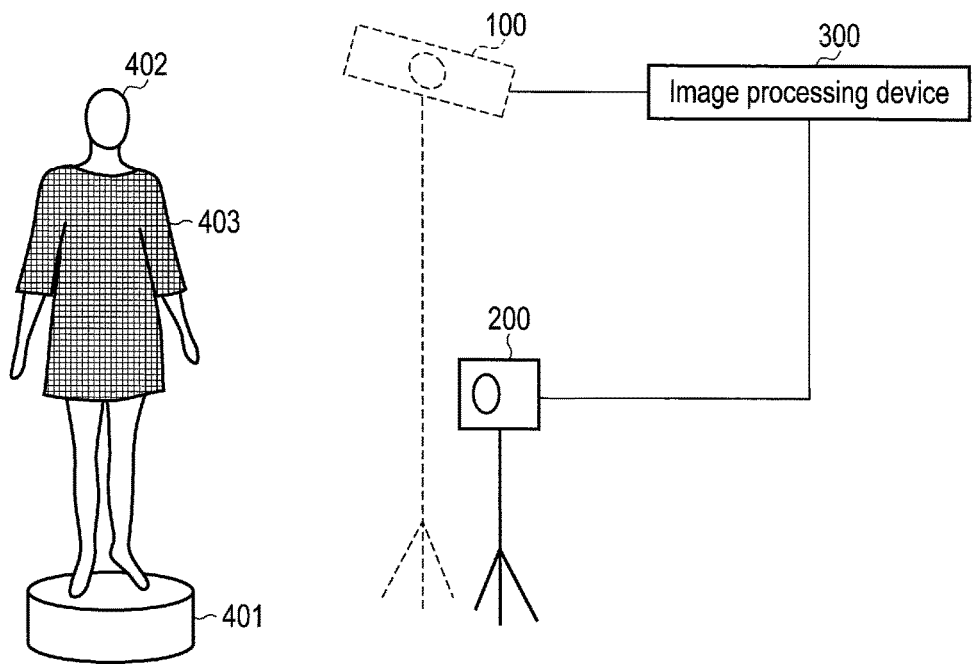
FIG. 2 is a diagram for describing the example of a configuration of the image processing system.

First, the description will be given with reference to FIGS. 1 and 2 about an exemplary configuration of an image processing system which includes an image processing device according to a first embodiment. As illustrated in FIGS. 1 and 2, the image processing system includes a first image capture unit 100, a second image capture unit 200, and an image processing device 300.

As illustrated in FIG. 1, the first image capture unit 100 is an image capture device which captures the image of a subject 402 placed on a turntable 401 which is rotatable at an arbitrary angle for example, and outputs an image (hereinafter, referred to as a depth image of the subject 402) which contains the subject 402. The depth image is also referred to as a distance image in which a distance from the first image capture unit 100 is defined for every pixel. A depth sensor may be used as the first image capture unit 100.

As illustrated in FIG. 2, the second image capture unit 200 is an image capture device which is placed in the turntable 401, captures the image of the subject 402 wearing clothing 403, and outputs an image (hereinafter, referred to as captured clothing image) which contains the subject 402 wearing the clothing 403. The captured clothing image is a bitmap image, and defines a pixel value which indicates a color and a brightness of the subject 402 (the clothing 403) for every pixel. A general-purpose camera may be used as the second image capture unit 200.

Herein, in this embodiment, the subject 402 captured by the first image capture unit 100 and the second image capture unit 200 is a target which tries on the clothing. In FIGS. 1 and 2, it is assumed that the subject 402 is a mannequin resembling the shape of human body for example. While the subject 402 will be described as a mannequin in the following description, the subject 402 may be the mannequin resembling the shape of dog or cat and other objects, and living things such as a person or a pet.

The depth image of the subject 402 output by the first image capture unit 100 and the captured clothing image output by the second image capture unit 200 are acquired by the image processing device 300. The image processing device 300 has a function of generating an image (hereinafter, referred to as clothing image) indicating a state of the clothing 403 in a case where the subject wears the clothing 403 in a situation (for example, direction, posture, or body type) different from the subject 402 wearing the clothing 403 using the acquired depth image and the acquired captured clothing image of the subject 402. In this way, the clothing image generated by the image processing device 300 is accumulated (stored) in the image processing device 300.

The clothing image accumulated in the image processing device 300 according to this embodiment is used in a virtual try-on. Specifically, a user can virtually try on the clothing 403 (hereinafter, referred to as virtual try-on) by displaying a synthesized image obtained by superimposing the clothing image (that is, the image of the clothing 403) accumulated in the image processing device 300 on the image containing the user captured by an image capture unit into a display device which is provided at a position where the user faces in a store where sells the clothing 403 for example.

Further, while not illustrated in FIGS. 1 and 2, the image processing system may further include a server device which is connected to communicate with the image processing device 300 through a network for example. In this case, the clothing image generated by the image processing device 300 may be accumulated (stored) in the server device.

FIG. 3 is a block diagram illustrating a functional configuration of the image processing device 300 according to this embodiment. As illustrated in FIG. 3, the image processing device 300 includes a 3D model acquisition module 301, a 3D model projection module 302, a control point setting module 303, a control point changing module 304, a captured clothing image acquisition module 305, a clothing region extraction module 306, a mesh data generator 307, an influence degree calculator 308, a mesh data deformation module 309, a clothing image generator 310, a presentation processor 311, and a clothing image storage 312.

In this embodiment, it is assumed that some or all of these modules 301 to 311 may be realized by executing a program (that is, software) on at least one processor (computer) such as a CPU equipped in the image processing device 300 for example. Further, some or all of the respective modules 301 to 311 may be realized by hardware such as an IC (integrated circuit) equipped in the image processing device 300, or may be realized by a combination of hardware and software. In addition, in this embodiment, the clothing image storage 312 may be stored in a storage device such as an HDD (Hard Disk Drive) coupled to the processor equipped in the image processing device 300. Further, the clothing image storage 312 may be included in an external device (server device) which is connected to communicate with the image processing device 300 for example.

The 3D model acquisition module 301 acquires the depth image of the subject 402 which is output from the first image capture unit 100. The 3D model acquisition module 301 acquires (generates) a three-dimensional model (hereinafter, referred to as 3D model) of the subject 402 by modeling the subject 402 based on the acquired depth image of the subject 402. Herein, the 3D model of the subject 402 acquired by the 3D model acquisition module 301 is a model showing a state (direction, posture, and body type) of the subject 402 captured by the first image capture unit 100.

In addition, the 3D model acquisition module 301 acquires a 3D model different from the 3D model by deforming the acquired 3D model for example.

In the following description, the 3D model (first three-dimensional model) acquired based on the depth image of the subject 402 will be referred to as a before-deformation 3D model, and the 3D model (second three-dimensional model) acquired by deforming the before-deformation 3D model will be referred to as an after-deformation 3D model. Further, the after-deformation 3D model contains the 3D model in which the direction, the posture, or the body type of the before-deformation 3D model is changed for example.

As described above, the 3D models (the before-deformation 3D model and the after-deformation 3D model) acquired by the 3D model acquisition module 301 is configured by a plurality of vertexes, and three-dimensional positions (coordinates) of the vertex are respectively added to the plurality of vertexes. A number (hereinafter, referred to as vertex number) is allocated to each of the plurality of vertexes of the 3D model to identify the vertexes. Further, the same vertex number is allocated to the vertex (that is, the vertex at the same position in the deformation 3D model) corresponding to the before-deformation 3D model and the after-deformation 3D model.

The 3D model projection module 302 projects the 3D model (the before-deformation 3D model and the after-deformation 3D model) acquired by the 3D model acquisition module 301 onto a screen surface. In this case, the 3D model projection module 302 projects the 3D model in accordance with a viewpoint position and an angle of view of the second image capture unit 200 (a viewpoint position and an angle of view of the captured clothing image).

The control point setting module 303 sets a plurality of control points (first control points) on the before-deformation 3D model acquired by the 3D model acquisition module 301. In this case, the control point setting module 303 sets (selects) a control point from among the plurality of vertexes of the before-deformation 3D model with reference to the before-deformation 3D model projected onto the screen by the 3D model projection module 302.

Similarly, the control point setting module 303 sets a plurality of control points (second control points) on the after-deformation 3D model acquired by the 3D model acquisition module 301. In this case, the control point setting module 303 sets (selects) a control point corresponding to the control point set on the before-deformation 3D model from among the plurality of vertexes of the after-deformation 3D model.

The control point changing module 304 changes the control point set by the control point setting module 303 according to a user's operation on the image processing device 300 for example.

The captured clothing image acquisition module 305 acquires the captured clothing image which is output from the second image capture unit 200.

The clothing region extraction module 306 extracts a region (hereinafter, referred to as clothing region) of the clothing 403 worn by the subject 402 contained in the captured clothing image from the captured clothing image acquired by the captured clothing image acquisition module 305.

The mesh data generator 307 generates mesh data indicating the meshed clothing region by dividing the clothing region extracted by the clothing region extraction module 306 in a mesh shape. Further, the mesh data generated by the mesh data generator 307 contains the plurality of vertexes by meshing the clothing region.

The influence degree calculator 308 calculates an influence degree (that is, an influence degree of the control point on the vertex) indicating a degree of influence of a movement of each of the plurality of control points set on the before-deformation 3D model in a case where the before-deformation 3D model is deformed (that is, direction, posture, or body type of the subject 402 are deformed) with respect to (the movement of) each of the plurality of vertexes of the mesh data generated by the mesh data generator 307. Further, the influence degree calculator 308 calculates the influence degree for each combination of each of the plurality of control points set on the before-deformation 3D model by the control point setting module 303 and each of the plurality of vertexes of the mesh data generated by the mesh data generator 307.

The mesh data deformation module 309 performs a process of deforming (modifying) the mesh data based on the plurality of control points set on the before-deformation 3D model by the control point setting module 303, the plurality of control points set on the after-deformation 3D model by the control point setting module 303, the mesh data generated by the mesh data generator 307, and the influence degree calculated by the influence degree calculator 308. While the details of the process performed by the mesh data deformation module 309 will be described below, the mesh data deformation module 309 deforms (modifies) the mesh data generated by the mesh data generator 307 based on a moving amount from the plurality of control points set on the before-deformation 3D model toward the control point set on the after-deformation 3D model. In the following description, the mesh data deformed by the mesh data deformation module 309 is called after-deformation mesh data.

The clothing image generator 310 generates an image (that is, the clothing image) of the clothing 403 using the captured clothing image (the extracted clothing region) and the after-deformation mesh data. The clothing image generated by the clothing image generator 310 is an image showing a state of the clothing 403 in a case where the after-deformation 3D model (the subject of the direction, the posture, and the body type corresponding to the after-deformation 3D model) wears the clothing 403.

The clothing image generated by the clothing image generator 310 is presented (displayed) to a manager of the image processing device 300 by the presentation processor 311. In addition, the clothing image generated by the clothing image generator 310 is stored (accumulated) in the clothing image storage 312.

Next, a processing procedure of the image processing device 300 according to this embodiment will be described with reference to a flowchart of FIG. 4.

First, the 3D model acquisition module 301 acquires the 3D model (the before-deformation 3D model) of the subject 402 based on the depth image of the subject 402 output from the first image capture unit 100 (Step S1). Further, the description herein will be given about a case where the before-deformation 3D model is acquired based on the depth image of the subject 402. However, the before-deformation 3D model may be acquired using a 3D scanner for example as long as having the same structure.

Figure 5:
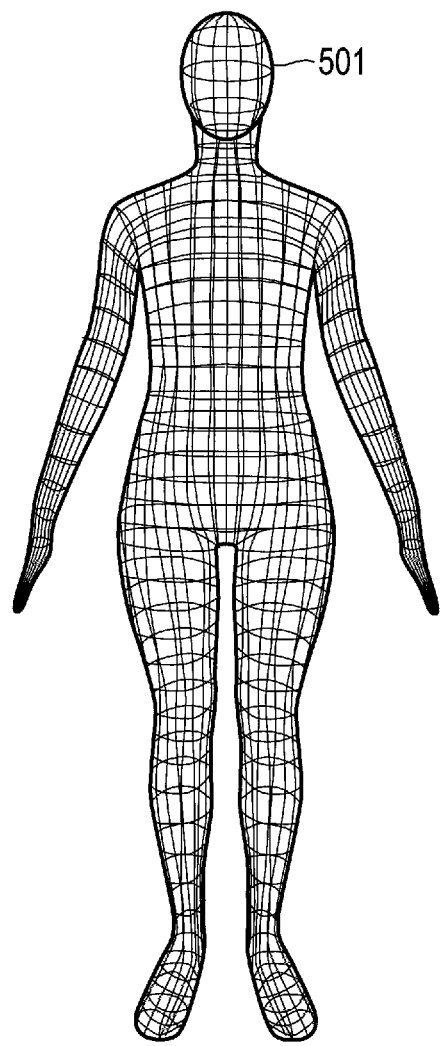
FIG. 5 is a diagram illustrating an example of a before-deformation 3D model.

Herein, FIG. 5 illustrates a before-deformation 3D model 501 which is acquired by the 3D model acquisition module 301. In the example illustrated in FIG. 5, the before-deformation 3D model 501 shows an example of the 3D model acquired based on the depth image of the subject 402 which faces the first image capture unit 100 in the substantially front direction. Further, the before-deformation 3D model 501 is configured by the plurality of vertexes. In addition, each of the plurality of vertexes is added with a three-dimensional position (coordinates) of the vertex. Further, each of the plurality of vertexes is allocated with the vertex number.

Returning to FIG. 4, the captured clothing image acquisition module 305 acquires the captured clothing image output from the second image capture unit 200 (Step S2). The captured clothing image is an image containing the subject 402 wearing the clothing 403 in the same state (posture) as that at the time of being captured by the first image capture unit 100.

Next, the clothing region extraction module 306 extracts the clothing region (that is, the outline of the clothing 403 worn by the subject 402 contained in the captured clothing image) from the captured clothing image by performing, for example, a mask process on the captured clothing image acquired by the captured clothing image acquisition module 305 (Step S3).

Figure 6:
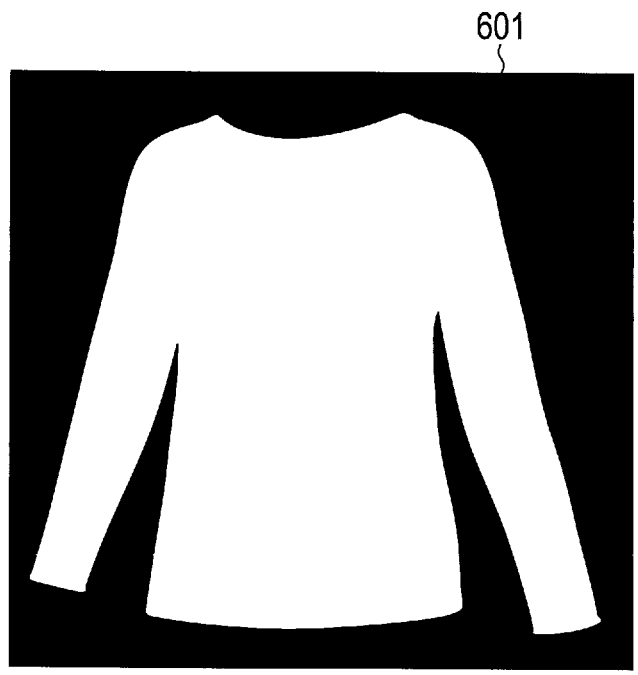
FIG. 6 is a diagram illustrating an exemplary clothing region.

Herein, FIG. 6 illustrates a clothing region 601 (that is, an extraction result of the clothing region extraction module 306) which is extracted by the clothing region extraction module 306. Such an extraction of the clothing region 601 may be realized using a general-purpose image editing tool for example.

Figure 7:
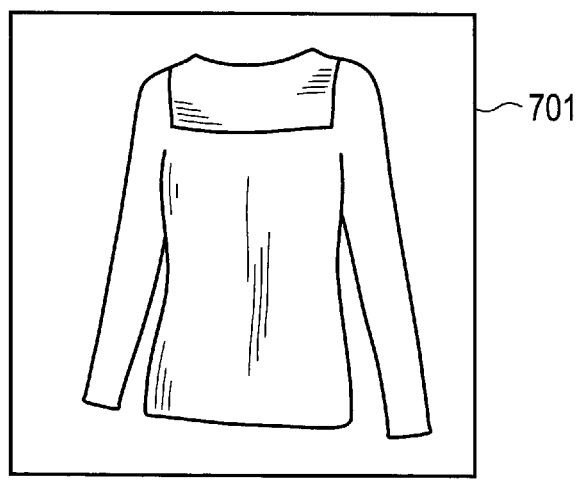
FIG. 7 is a diagram illustrating an exemplary clothing image acquired from a captured clothing image.

Further, a clothing image (that is, an image of the clothing 403 worn by the subject 402 captured by the second image capture unit 200) 701 as illustrated in FIG. 7 can be acquired (taken off) from the captured clothing image acquired by the captured clothing image acquisition module 305 using the clothing region 601 which is extracted by the clothing region extraction module 306. The clothing image 701 thus acquired is accumulated in the clothing image storage 312 to be used in the virtual try-on.

Returning to FIG. 4, the control point setting module 303 sets the plurality of control points on the before-deformation 3D model 501 acquired by the 3D model acquisition module 301 (Step S4). In this case, the 3D model projection module 302 projects, for example, the before-deformation 3D model 501 acquired by the 3D model acquisition module 301 onto the screen surface in accordance with the viewpoint position and the angle of view of the second image capture unit 200. Further, a positional relation between the first image capture unit 100 and the second image capture unit 200 is assumed to be calibrated in advance. Therefore, the control point setting module 303 sets (selects) a vertex (that is, a vertex appearing in the forefront surface when the before-deformation 3D model 501 is projected onto the screen surface) at a position in the outmost peripheral part of the before-deformation 3D model in projection from among the plurality of vertexes of the before-deformation 3D model 501. In this case, the control point setting module 303 stores the vertex number allocated to each of the plurality of control points set on the before-deformation 3D model 501 in the control point setting module 303.

Herein, while the description will be given about a case where the control point is selected from among all the vertexes of the before-deformation 3D model, the vertexes (corresponding to a physical feature point) easily affected by a change in direction, posture, or body type of the body may be selected, and the control point may be selected from among the vertexes. Specifically, representative vertexes (for example, the vertexes at positions of shoulder, elbow, and waist) in the 3D model such as a plurality of directions, postures, or body types may be selected in advance.

Further, the vertexes related to the clothing 403 are selected in advance based on the shape (that is, a type of the clothing 403) of the clothing region extracted by the clothing region extraction module 306, and the control point may be selected from among the vertexes. Specifically, in a case where the clothing 403 is clothing for the upper body such as a top, a vertex positioned in the upper half body of the before-deformation 3D model may be selected in advance as the vertex related to the clothing 403. On the other hand, in a case where the clothing 403 is a lower clothing such a bottom, a vertex positioned in the lower half body of the before-deformation 3D model may be selected as the vertex related to the clothing 403.

Figure 8:
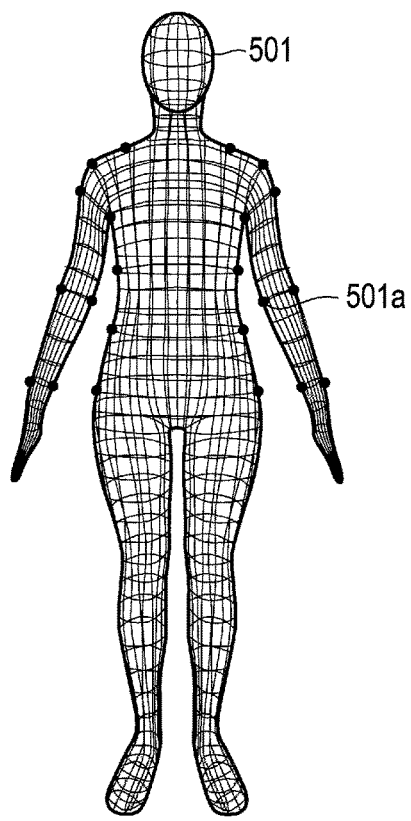
FIG. 8 is a diagram illustrating exemplary control points which are set on the before-deformation 3D model.

Herein, FIG. 8 illustrates exemplary control points set on the before-deformation 3D model 501 illustrated in FIG. 5. In FIG. 8, while only one control point is attached by a reference number for convenience sake, the plurality of control points including a control point 501a are set (disposed) on the before-deformation 3D model 501. In the example illustrated in FIG. 8, the clothing 403 is an upper clothing, and the control point is set from among the vertexes positioned in the upper half body of the before-deformation 3D model.

Further, the before-deformation 3D model 501 where the plurality of control points are set by the control point setting module 303 as illustrated in FIG. 8 is presented to a manager for example. Therefore, the manager can confirm the plurality of control points which are set on the before-deformation 3D model 501. Herein, in a case where the control point is necessarily changed as a result of the manager's confirmation on the plurality of control points, the control point changing module 304 changes the control point according to an operation of the manager (for example, moving, adding, and removing of the control point). With such a configuration, an intended vertex of the user can be set on the before-deformation 3D model 501.

Returning to FIG. 4, the mesh data generator 307 generates the mesh data (that is, the mesh data indicating the meshed clothing region 601) of the clothing region 601 by meshing (dividing in a mesh shape) the clothing region 601 extracted by the clothing region extraction module 306 (Step S5).

Figure 9:
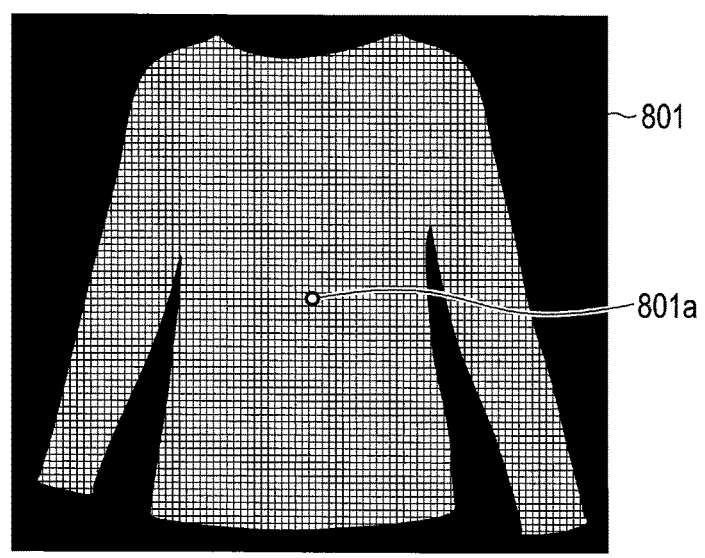
FIG. 9 is a diagram illustrating an example of mesh data.

Herein, FIG. 9 illustrates mesh data 801 generated by the mesh data generator 307. In FIG. 9, while only one vertex is attached by a reference number for convenience sake, the mesh data 801 contains the plurality of vertexes including a vertex 801a. Each of the plurality of vertexes is a vertex in a small region in the clothing region 601 divided in the mesh shape. The generation of such mesh data may be realized using a general-purpose CG (Computer Graphics) tool for example.

Returning to FIG. 4, the influence degree calculator 308 calculates the influence degree (that is, the influence degree of each control point with respect to each vertex) for each combination of each of the plurality of control points set on the before-deformation 3D model 501 by the control point setting module 303 and each of the plurality of vertexes of the mesh data 801 generated by the mesh data generator 307 (Step S6).

Herein, the description will be specifically made about a process when the influence degree of one control point (hereinafter, referred to as target control point) 501a among the plurality of control points is calculated with respect to one vertex (hereinafter, referred to as target vertex) 801a among the plurality of vertexes.

In this case, the influence degree calculator 308 generates an image 902 obtained by overlapping the mesh data (that is, the mesh data indicating the meshed clothing region 601) generated by the mesh data generator 307 with respect to an image 901 obtained by projecting the before-deformation 3D model 501 onto the screen surface of the 3D model projection module 302 as illustrated in FIG. 10. Further, the image 902 is an image indicating the state that the subject 402 wears the clothing 403.

Next, the influence degree calculator 308 calculates, as the influence degree of the target control point 501a with respect to the target vertex 801a, a distance between the target control point 501a and the target vertex 801a in a region 903 where the region (that is, a region generated by projecting the before-deformation 3D model 501 onto the screen surface) of the before-deformation 3D model 501 in the image 902 and the region of the mesh data 801 (that is, the clothing region 601 represented by the mesh data 801) are summed.

Herein, the description will be specifically given with reference to FIG. 11 about the distance between the target control point 501a and the target vertex 801a calculated as the influence degree by the influence degree calculator 308. FIG. 11 is an enlarged diagram of a region 903 illustrated in FIG. 10 (a region where the region of the before-deformation 3D model 501 and the region of the mesh data 801 are summed).

In the example illustrated in FIG. 11, the target control point 501a is assumed to be set at a position in the arm part (the region) of the before-deformation 3D model 501. On the other hand, the target vertex 801a is assumed to be disposed near the center portion of the mesh data 801.

In this case, the influence degree calculator 308 calculates a shortest path 1001 from the target vertex 801a passing through the region 903 to the target control point 501a, and calculates the distance between the target control point 501a and the target vertex 801a based on the calculated shortest path.

Further, in a case where the distance between the target control point 501a and the target vertex 801a is calculated as the influence degree, the influence degree shows that the influence of the target control point 501a on the target vertex 801a is bigger as the value (that is, the distance) is lower.

Herein, as the example illustrated in FIG. 11, in a case where the path from the target vertex 801a to the target control point 501a is bent, the calculating distance may be increased based on the path by multiplying or adding the value corresponding to the bending angle (that is, the influence of the target control point 501a on the target vertex 801a becomes small).

In addition, in a case where the path from the target vertex 801a to the target control point 501a is intersected with a skeleton of the before-deformation 3D model (the subject 402), the distance to be calculated based on the path may be increased. Further, (the position of) the skeleton of the before-deformation 3D model is assumed to be estimated from a position of the joint in the before-deformation 3D model.

In this embodiment, the distance between the target control point 501a and the target vertex 801a is calculated as the influence degree, so that the control point set at a position of the arm part and the control point set at a position of the body of the 3D model 501 does not affect on each other.

Returning to FIG. 4, the 3D model acquisition module 301 acquires the after-deformation 3D model by deforming the before-deformation 3D model 501 acquired in Step S1 (Step S7). Further, the after-deformation 3D model is assumed to be generated by deforming (changing) at least one of the direction, the posture, and the body type of the before-deformation 3D model for example.

Herein, FIG. 12 illustrates an after-deformation 3D model 502 acquired by the 3D model acquisition module 301. In the example illustrated in FIG. 12, the after-deformation 3D model 502 is an exemplary 3D model in which the before-deformation 3D model 501 illustrated in FIG. 5 is changed in direction by about 10 degrees. The after-deformation 3D model 502 is configured by the plurality of vertexes similarly to the before-deformation 3D model 501. In the before-deformation 3D model and the after-deformation 3D model, the corresponding vertexes (that is, the vertexes at the same position in structure) are allocated by the same vertex number.

Further, if the vertexes (the allocated vertex numbers) correspond to each other with respect to the before-deformation 3D model, the after-deformation 3D model may be acquired (generated) based on the depth image output when the first image capture unit 100 captures the subject 402 of which the direction is changed by rotating the turntable 401 for example.

Returning to FIG. 4, the control point setting module 303 sets the plurality of control points on the after-deformation 3D model 502 which is acquired by the 3D model acquisition module 301 (Step S8). In this case, the control point setting module 303 sets the control point corresponding to the control point set on the before-deformation 3D model 501 among the plurality of vertexes of the after-deformation 3D model 502 (that is, the vertex corresponding to the vertex set as the control point on the before-deformation 3D model 501 is set as the control point). Specifically, the control point setting module 303 sets, as the control point, a vertex allocated with the same vertex number (that is, the vertex number allocated to each of the plurality of control points set on the before-deformation 3D model 501) as the vertex number stored in the control point setting module 303 in Step S4.

Herein, FIG. 13 illustrates an exemplary control point set on the after-deformation 3D model 502 illustrated in FIG. 12. In FIG. 13, while only one control point is attached by the reference number for convenience sake, the plurality of control points including the control point 502a are set (disposed) on the after-deformation 3D model 502. Further, the control point 502a set at the same position (a portion of the left arm) as the control point 501a set on the before-deformation 3D model 501 illustrated in FIG. 8 is the control point corresponding to the control point 501a (that is, the control point allocated with the same vertex number as that of the control point 501a).

Returning to FIG. 4, the mesh data deformation module 309 deforms (modifies) the mesh data generated in Step S5 based on the plurality of control points set on the before-deformation 3D model in Step S4, the influence degree calculated in Step S7 (that is, the influence degree of each control point with respect to each vertex), and the plurality of control points set on the after-deformation 3D model in Step S8 (Step S9). In this case, the mesh data deformation module 309 determines (changes) a position of each of the plurality of vertexes of the mesh data by taking an influence degree-weighted average of the corresponding moving amounts (vector) of the control points set on the before-deformation 3D model and the after-deformation 3D model for example. As illustrated in FIG. 14, when such a process is performed, the mesh data (after-deformation mesh data) 802 is generated by deforming the mesh data 801 illustrated in FIG. 9.

Further, a rigid deformation method may be used as a deformation algorithm of the mesh data. The influence degree may be used as the distance used in this method.

Hereinafter, a deformation process of the mesh data in a case where a rigid deformation method is used will be specifically described. Herein, the description will be given about a case where a position of a vertex j among the plurality of vertexes of the mesh data is determined. Further, "j" is an index of a vertex of the mesh data.

The following process is performed on all the vertexes of the mesh data. Since the process is performed separately on all the vertexes of the mesh data, $\vec{v}_j$, $\vec{r}_j$, $D_{ij}$ are will be denoted as $\vec{v}_j$, $\vec{r}$, $D_i$ by omitting the index j of the vertex.

First, the mesh data deformation module 309 calculates $w_i$ with respect to all the control points i based on the following Equation (1). Further, "i" is an index of the control point set on the before-deformation 3D model 501.

$$w_i = \frac{1}{(D_i)^{2\alpha}} \qquad \text{Equation (1)}$$

In Equation (1), $D_i$ is a distance from the vertex j to the control point i (that is, the influence degree of the control point i with respect to the vertex j). In addition, "α" in Equation (1) is an integer number, and may be "1" or "2".

Next, the mesh data deformation module 309 calculates $\vec{p}^*$ based on the following Equation (2).

$$\vec{p}^* = \frac{\sum_i w_i \vec{p}_i}{\sum_i w_i} \qquad \text{Equation (2)}$$

Further, in Equation (2), $\vec{p}_i$ is a two-dimensional coordinate of the control point i set on the before-deformation 3D model.

Subsequently, the mesh data deformation module 309 calculates $\hat{p}_i$ on all the control points i based on the following Equation (3).

$$\hat{p}_i = \vec{p}_i - \vec{p^*} \quad \text{Equation (3)}$$

Next, the mesh data deformation module 309 calculates μ based on the following Equation (4).

$$\mu = \sum_i w_i(\hat{p}_i \cdot \hat{p}_i) \quad \text{Equation (4)}$$

In addition, the mesh data deformation module 309 calculates $\vec{d}$ based on the following Equation (5).

$$\vec{d} = \vec{v} - \vec{p^*} \quad \text{Equation (5)}$$

In Equation (5), v is a two-dimensional coordinate of the vertex j.

Next, the mesh data deformation module 309 calculates $A_i$ based on the following Equation (6).

$$A_i = w_i \begin{bmatrix} \hat{p}_i \cdot \vec{d} & -\hat{p}_i \cdot (\vec{d})^\perp \\ -(\hat{p}_i)^\perp \cdot \vec{d} & (\hat{p}_i)^\perp \cdot (\vec{d})^\perp \end{bmatrix} \quad \text{Equation (6)}$$

Further, in Equation (6), when $\vec{t}$ is (x, y), $(\vec{t})^\perp$ is defined as (−y, x).

Furthermore, the mesh data deformation module 309 calculates $\vec{q^*}$ based on the following Equation (7).

$$\vec{q^*} = \frac{\sum_i w_i \vec{q}_i}{\sum_i w_i} \quad \text{Equation (7)}$$

Further, in Equation (7), $\vec{q}_i$ is a two-dimensional coordinate of the control point i set on the after-deformation 3D model.

Subsequently, the mesh data deformation module 309 calculates $\hat{q}_i$ with respect to all the control points i based on the following Equation (8):

$$\hat{q}_i = \vec{q}_i - \vec{q^*} \quad \text{Equation (8)}$$

Next, the mesh data deformation module 309 applies μ calculated based on the above Equation (4), $A_i$ calculated based on Equation (6), and $\hat{q}_i$ calculated based on Equation (8) to the following Equation (9) and calculates $\vec{f}$.

$$\vec{f} = \sum_i \hat{q}_i \frac{A_i}{\mu} \quad \text{Equation (9)}$$

Finally, the mesh data deformation module 309 calculates $\vec{r}$ based on the following Equation (10).

$$\vec{r} = \vec{f} \left| \frac{\vec{d}}{\vec{f}} \right| + \vec{q^*} \quad \text{Equation (10)}$$

Further, r calculated based on Equation (10) is a two-dimensional position (coordinate) in the after-deformation mesh data of the vertex j.

In this embodiment, the two-dimensional coordinate in the after-deformation mesh data is calculated with respect to all of the plurality of vertexes of the mesh data using Equations (1) to (10) described above. The mesh data 801 illustrated in FIG. 9 can be deformed into the after-deformation mesh data 802 by setting the position of each of the plurality of vertexes of the mesh data to the calculated two-dimensional coordinate.

A connection relation between the vertexes for configuring the mesh surface of the mesh data is assumed not to be changed in the process of Step S9. In addition, as described above, it is assumed that all the vectors used in the deformation algorithm of the mesh data are row vectors.

Further, in a case where the path from the target vertex 801*a* to the target control point 501*a* is intersected with the skeleton of the before-deformation 3D model, the distance calculated based on the path can be increased as described above. In this case, the mesh in the after-deformation mesh data 802 may be distorted (turned over) in a region near the skeleton. This distortion may be eliminated from the after-deformation mesh data 802 by fixing the vertex in the vicinity of a contour of the after-deformation mesh data 802 and by applying a Laplacian filter to each vertex (coordinate) of the after-deformation mesh data 802.

Next, the clothing image generator 310 generates an image (clothing image) of the clothing 403 using the captured clothing image and the after-deformation mesh data 802 (Step S10).

Herein, the shape of the clothing region 601 represented by the mesh data (hereinafter, referred to as before-deformation mesh data) 801 generated in Step S5 is matched to the shape of the clothing 403 contained in the captured clothing image. Therefore, colors corresponding to the plurality of vertexes of the before-deformation mesh data 801 can be specified from the captured clothing image.

Therefore, the clothing image generator 310 can generate, for example, a clothing image 702 as illustrated in FIG. 15 by adding the color corresponding to each of the plurality of vertexes of the after-deformation mesh data 802. Further, the clothing image 702 illustrated in FIG. 15 is obtained by deforming the clothing image 701 illustrated in FIG. 7, and is an image showing a state (that is, a direction is changed from that of the clothing 403 worn by the subject 402 captured by the second image capture unit 200) of the clothing 403 in a case where the after-deformation 3D model 502 wears the clothing 403.

Next, the presentation processor 311 presents the clothing image 702 which is generated by the clothing image generator 310 (Step S11). Thus, the manager can confirm the clothing image 702.

Herein, in a case where the clothing image 702 is not appropriate (that is, the clothing image 702 is needed to be correct) as a result that the manager confirms the clothing image 702, it is possible to command to change (for example, move, add, and erase of the control point) of the control point set on the before-deformation 3D model 501.

In this case, it is determined whether a change of the control point set on the before-deformation 3D model 501 is commanded (Step S12).

In a case where it is determined that the change of the control point is commanded (YES in Step S12), the control point is changed according to an operation of the manager for example, and the procedure returns to Step S6 and the process is repeatedly performed.

On the other hand, in a case where it is determined that the change of the control point is not commanded (NO in Step S12), that is, in a case where the correction of the clothing image 702 is not necessary, the clothing image 702 is accumulated in the clothing image storage 312 (Step S13). In this case, the clothing image 702 is stored in association with the state (direction, posture, and body type) of the after-deformation 3D model 502 for example.

Herein, the description has been given such that the clothing image 702 indicating a direction different from the clothing 403 worn by the subject 402 is generated by acquiring the after-deformation 3D model 502 obtained by changing the direction of the before-deformation 3D model 501 for example. However, the clothing image of a state where the position of the sleeve is different from the clothing 403 worn by the subject 402 may be, for example, generated by acquiring an after-deformation 3D model 503 obtained by changing the position of the arm part as illustrated in FIG. 16. In this way, in this embodiment, it is possible to generate the clothing image indicating the state of the clothing 403 in a case where the subject of various types (direction, posture, or body type) wears the clothing 403 by acquiring (generating) various after-deformation 3D models obtained by changing the direction, the posture, and the body type of the before-deformation 3D model 501. Specifically, it is possible to generate a clothing image in a direction of ±5 and ±10 degrees from an angle (for example, a rotation angle of 0 degree) of the before-deformation 3D model 501, a clothing image having different opening of the arm, and a clothing image indicating the state of the clothing which is fitted to a different body type.

As described above, in this embodiment, the before-deformation 3D model (first three-dimensional model) 501 of the subject 402 is acquired, the mesh data 801 is generated by dividing the clothing region 601 extracted from the captured clothing image in the mesh shape, and the before-deformation 3D model 501 is deformed to acquire the after-deformation 3D model (second three-dimensional model) 502. Further, in this embodiment, the mesh data 801 is deformed based on the moving amount from the plurality of control points (first control points) set on the before-deformation 3D model 501 toward the plurality of control points (second control points) set on the after-deformation 3D model 502, and the clothing image is generated using the captured clothing image and the deformed mesh data 802.

In other words, with such a configuration of this embodiment, it is possible to generate the clothing image 702 only by capturing the subject (for example, a mannequin) 402 of specific direction, posture, and body type wearing the clothing 403 using the second image capture unit 200. The clothing image 702 is an image indicating the state of the clothing 403 in a case where the subject of different direction, posture, and body type wears the clothing 403 (that is, an image obtained by deforming two-dimensionally the image 701 of the clothing 403 worn by the subject 402). Therefore, in this embodiment, the cost and time necessary for generating the clothing image can be reduced, and the clothing image for the virtual try-on can be easily generated.

In addition, in this embodiment, the influence degree is calculated which indicates a degree of influence on each of the plurality of vertexes of the mesh data 801 due to the moving of each of the plurality of control points set on the before-deformation 3D model 501 in a case where the before-deformation 3D model 501 is deformed. The mesh data is deformed using the influence degree. Further, the influence degree calculated in this embodiment includes a distance between each control point and each vertex in the region where the region of the before-deformation 3D model 501 and the clothing region 601 represented by the mesh data 801 are summed in a case where the mesh data 801 is overlapped with the before-deformation 3D model 501 to indicate the state that the subject 402 wears the clothing 403. With such a configuration of this embodiment, it is possible to deform the mesh data not to cause the influence between the control point of the arm part set on the 3D model and the control point of the body. Therefore, the mesh data can be more appropriately deformed, and as a result the clothing image 702 can be generated with a high accuracy.

In addition, in this embodiment, the vertex, which is positioned in the outer peripheral part of the before-deformation 3D model 501 and corresponds to the physical feature point in the before-deformation 3D model 501, is set as the control point on the before-deformation 3D model 501. Therefore, the mesh data can be deformed to appropriately reflect the moving of the control point between the before-deformation 3D model 501 and the after-deformation 3D model 502.

The image processing device 300 according to this embodiment accumulates the clothing images of various patterns (direction, posture, and body type). Therefore, a body type parameter of a user captured by the image capture unit is acquired when the user virtually tries on in the store as described above, so that the clothing image corresponding to a body type parameter similar to the user's body type parameter can be selected. Therefore, it is possible to display a synthesized image with a high accuracy indicating the state that the user wears clothing (the state that the clothing is fitted to the direction, posture, and body type of the user).

Further, the description in this embodiment has been given about a case where the clothing images of various patterns are accumulated. For example, only the 3D model (that is, the before-deformation 3D model) 501 and the captured clothing image of the subject 402 wearing the clothing 403 are accumulated for every clothing 403. Then, the clothing image fitted to the direction, posture, body type of the user may be generated by acquiring the after-deformation 3D model corresponding to the state of the user at the time of virtual try-on. In other words, the clothing image in this embodiment may be generated even at the time of virtual try-on in the store.

Second Embodiment

Figure 17:
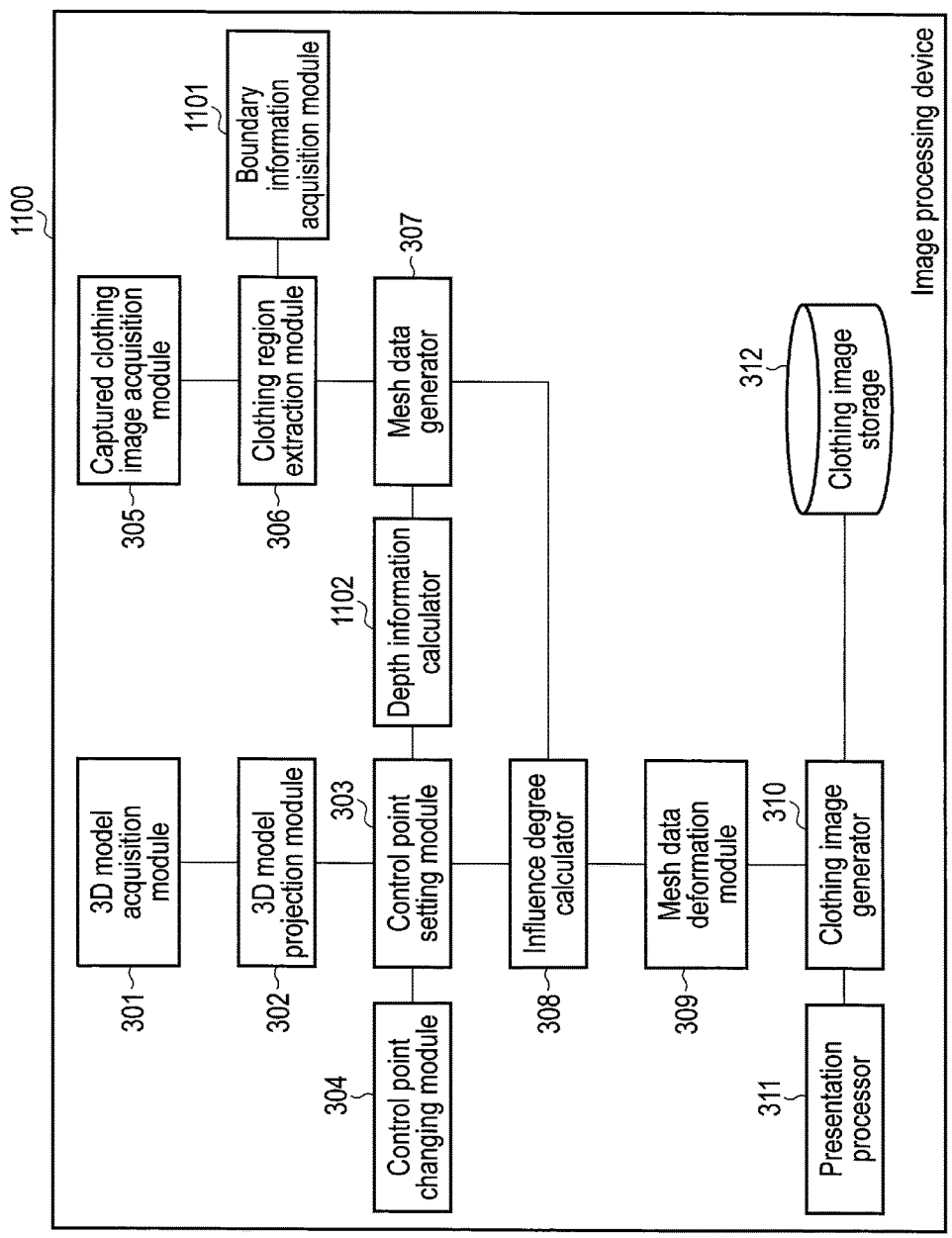
FIG. 17 is a block diagram illustrating an exemplary functional configuration of an image processing device according to a second embodiment.

Next, a second embodiment will be described. FIG. 17 is a block diagram illustrating a functional configuration of an image processing device according to this embodiment. Further, the same portions as those of FIG. 3 will be attached with the same symbols, and the description thereof will be omitted. Herein, the description will be focused on the portion different from those of FIG. 3.

In addition, the configuration of an image processing system equipped with the image processing device according to this embodiment is similar to that of the first embodiment, and thus will be roughly described using FIGS. 1 and 2.

As illustrated in FIG. 17, an image processing device 1100 according to this embodiment includes a boundary information acquisition module 1101 and a depth information calculator 1102.

In this embodiment, it is assumed that some or all of these modules 1101 and 1102 may be realized by executing a program (that is, software) on at least one processor equipped in the image processing device 1100 for example. Further, some or all of the respective modules 1101 and 1102 may be realized by hardware equipped in the image processing device 1100, or may be realized by combination of hardware and software.

Herein, in a case where the clothing 403 worn by the subject 402 has swelling in the arm or body part, there is a possibility that the arm part and the body part are integrated in the clothing region extracted from the captured clothing image. In a case where the arm part and the body part are integrated as described above, the shortest distance between the control point set at a position of the arm part and the vertex disposed in the body part is decreased (that is, the influence degree of the control point with respect to the vertex is increased). Therefore, when the mesh data is deformed, the body part may be also distorted according to the change in position of the arm part.

Therefore, in this embodiment, the boundary information acquisition module 1101 acquires the boundary information indicating a boundary of the clothing region extracted by the clothing region extraction module 306. Further, the boundary information acquired by the boundary information acquisition module 1101 is used to calculate the distance (that is, the influence degree of each control point with respect to each vertex) between each of the plurality of control points set on the before-deformation 3D model and each of the plurality of vertexes of the mesh data as described above.

In addition, the mesh data of the clothing region in the first embodiment is two-dimensional data. Therefore, in a case where the mesh data is deformed, the meshes of the arm part and the body part may be overlapped to each other for example. In a case where the clothing image is generated using such mesh data, there is a possibility that the clothing image is not correctly drawn.

In this embodiment, the depth information calculator 1102 calculates depth information corresponding to each of the plurality of vertexes of the mesh data which is generated by the mesh data generator 307. Further, the depth information corresponding to each of the plurality of vertexes is calculated based on the depth information (information indicating a position of the control point in a depth direction with respect to the second image capture unit 200) of the three-dimensional position (coordinate) attached to the control point (vertex) set on the after-deformation 3D model. The depth information calculated by the depth information calculator 1102 is used when the after-deformation mesh data is used to generate the clothing image as described above.

Next, the description will be given with reference to a flowchart of FIG. 18 about a processing procedure of the image processing device 1100 according to this embodiment.

Figure 4:
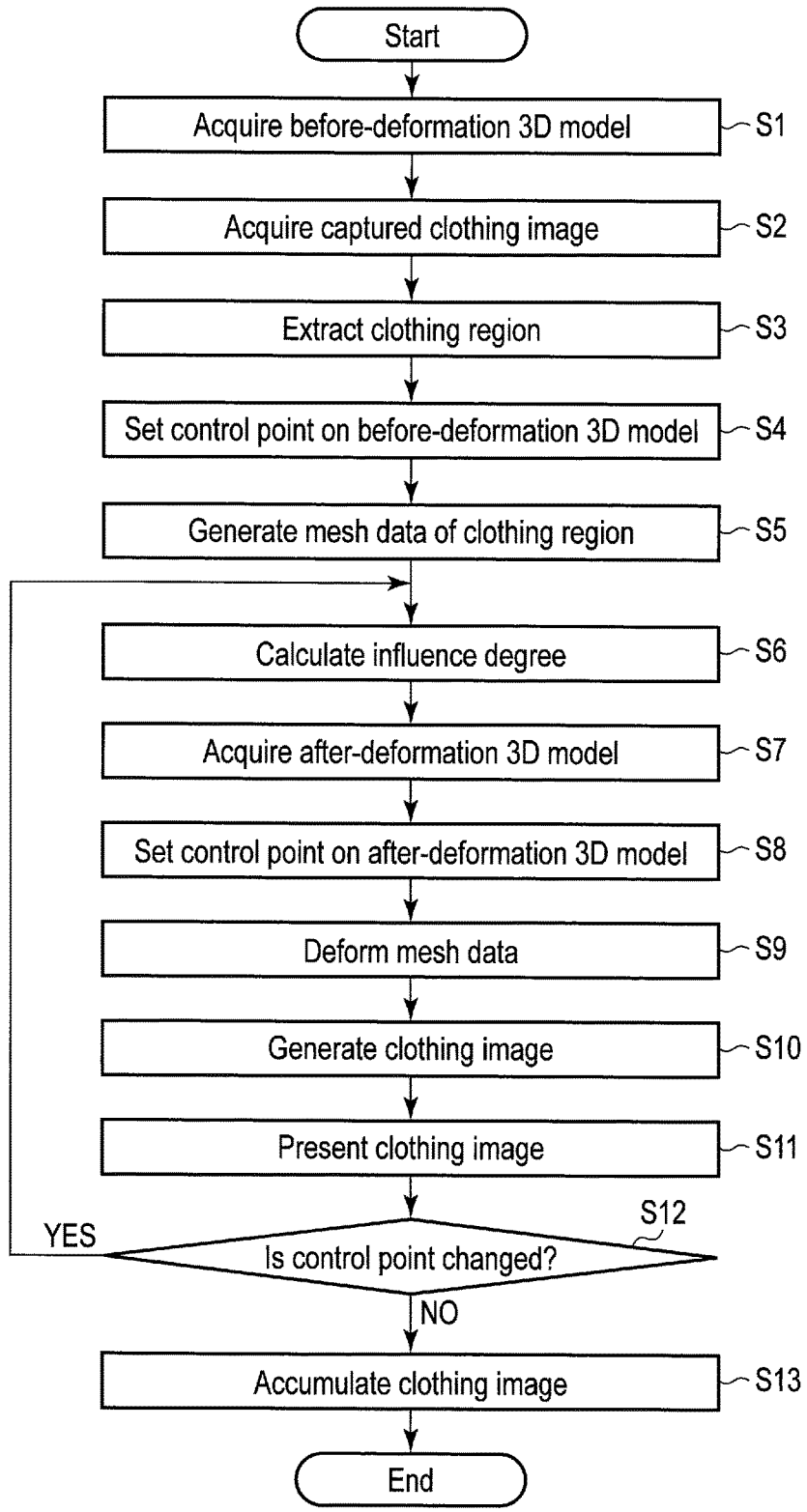
FIG. 4 is a flowchart illustrating an exemplary processing procedure of the image processing device.

First, the processes of Steps S21 to S23 corresponding to the process of Steps S1 to S3 illustrated in FIG. 4 are performed.

Next, the boundary information acquisition module 1101 acquires the boundary information indicating a boundary (region boundary) of the clothing region extracted from the captured clothing image by the clothing region extraction module 306 (Step S24).

Specifically, in a case where the clothing region is extracted in Step S23, the clothing region is presented to the manager. Therefore, the manager can confirm the clothing region (that is, the extraction result) extracted by the clothing region extraction module 306.

Herein, FIG. 19 illustrates an example of the captured clothing image acquired by the captured clothing image acquisition module 305. In addition, FIG. 20 illustrates an example of the clothing region extracted from the captured clothing image illustrated in FIG. 19. The arm part and the body part are integrated in the clothing region illustrated in FIG. 20. In such a clothing region (the mesh data thereof), the shortest distance between the control point set at a position of the arm part and the vertex disposed in the body part is calculated small in the calculation process of the influence degree described below. Therefore, the influence degree is not suitable.

In this case, the manager can designate a boundary (the boundary information) on the presented clothing region as illustrated in FIG. 21. In the example illustrated in FIG. 21, boundaries 1201 and 1202 are designated in both armpits of the clothing region.

Therefore, in Step S24, the boundary information acquisition module 1101 can acquire the boundary information designated by the manager as described above.

In this way, the boundary information acquired by the boundary information acquisition module 1101 is added (given) to the clothing region as attribute information.

When the process of Step S24 is performed, Steps S25 and S26 corresponding to Step S4 and S5 illustrated in FIG. 4 are performed.

Next, the depth information calculator 1102 calculates the depth information corresponding to each of the plurality of vertexes of the mesh data which is generated by the mesh data generation module 307 (Step S27).

Specifically, the mesh data is overlapped on the before-deformation 3D model to show the state that the subject 402 wears the clothing 403 as described above. In this case, the depth information calculator 1102 calculates (interpolates) the coordinates (that is, the depth information) indicating the position in the depth direction of the vertex from the three-dimensional position (coordinates). The three-dimensional position is added to the vertex of the after-deformation 3D model corresponding to the control point (that is, the vertex forming the before-deformation 3D model) positioned in the vicinity of each of the plurality of vertexes of the mesh data. In this way, the depth information corresponding to each of the plurality of vertexes of the mesh data calculated by the depth information calculator 1102 is added to the vertex.

Next, the influence degree calculator 308 calculates the influence degree (the influence degree of each control point with respect to each vertex), for each combination of each of the plurality of control points set on the before-deformation 3D model by the control point setting module 303 and each of the plurality of vertexes of the mesh data generated by the mesh data generator 307 (Step S28).

In this case, the influence degree calculator 308 calculates the influence degree of the control point with respect to each vertex (that is, the distance between each vertex and each control point) based on the shortest path from each vertex to each control point as described in the first embodiment. In this embodiment, the shortest path in this case is assumed as a path (for example, a path 1301) which does not pass across the boundaries 1201 and 1202 indicated by the boundary information added to the clothing region (the mesh data) as illustrated in FIG. 22.

When the process of Step S28 is performed, the processes of Steps S29 to S31 corresponding to the processes of Steps S7 to S9 illustrated in FIG. 4 are performed.

Next, the clothing image generator 310 generates the clothing image by adding the corresponding color to each of the plurality of vertexes of the after-deformation mesh data (Step S32). At this time, the clothing image generator 310 generates the clothing image having a correct depth relation by jointly using a Z buffer for example. Specifically, the clothing image generator 310 performs a hidden surface elimination process based on the depth information added to each of the plurality of vertexes of the after-deformation mesh data.

When the process of Step S32 is performed, the processes of Steps S33 to S35 corresponding to the processes of Steps S11 to S13 illustrated in FIG. 4 are performed. Further, in a case where it is determined in Step S34 that the control point is commanded to be changed, the procedure returns to Step S27 and the process is repeatedly performed.

As described above, in this embodiment, the depth information corresponding to the vertex is added to each of the plurality of vertexes of the mesh data. When the clothing image is generated, the hidden surface elimination process is performed based on the depth information added to the deformed mesh data (after-deformation mesh data). Therefore, the drawing can be performed in the corrected depth relation, so that the clothing image can be generated with a high accuracy.

Further, in this embodiment, the boundary information indicating the boundary of the extracted clothing region is acquired, and the distance between each control point and each vertex is calculated using the boundary information. Therefore, an appropriate influence degree can be calculated. As a result, it is possible to generate a correct clothing image according to the change of the before-deformation 3D model and the after-deformation 3D model.

Third Embodiment

Next, a third embodiment will be described. FIG. 23 is a block diagram illustrating a functional configuration of an image processing device according to this embodiment. Further, the same portions as those of FIG. 3 will be attached with the same symbols, and the description thereof will be omitted. Herein, the description will be focused on the portions different from those of FIG. 3.

In addition, the configuration of an image processing system equipped with the image processing device according to this embodiment is similar to that of the first embodiment, and thus will be roughly described using FIGS. 1 and 2.

As illustrated in FIG. 23, an image processing device 1400 according to this embodiment includes a captured clothing image acquisition module 1401 and a clothing image generator 1402.

In this embodiment, it is assumed that some or all of these modules 1401 and 1402 may be realized by executing a program (that is, software) on at least one processor equipped in the image processing device 1400 for example. Further, some or all of the respective modules 1401 and 1402 may be realized by hardware equipped in the image processing device 1400, or may be realized by combination of hardware and software.

The captured clothing image acquisition module 1401 acquires the captured clothing image which is output from the second image capture unit 200 and contains the subject 402 wearing the clothing 403. In the captured clothing image acquired by the captured clothing image acquisition module 1401, for example, there is included the clothing captured image (first captured clothing image) containing the subject 402 of a first state and the clothing captured image (second captured clothing image) containing the subject 402 of a second state different from the first state. Specifically, the first captured clothing image includes the captured clothing image containing the subject 402 facing the second image capture unit 200 (and the first image capture unit 100) in the substantially front direction for example. The second captured clothing image includes the captured clothing image containing the subject 402 facing in a direction (angle) rotated by about 10 degrees from the substantially front direction.

Further, in this embodiment, the before-deformation 3D model acquired by the 3D model acquisition module 301 is assumed as a model showing the first state (for example, direction, posture, and body type) of the subject 402. On the other hand, the after-deformation 3D model acquired by the 3D model acquisition module 301 is assumed as a model showing the second state (for example, direction, posture, and body type) of the subject 402.

The clothing image generator 1402 generates an image of the clothing 403 using the second captured clothing image acquired by the captured clothing image acquisition module 1401 and the mesh data (after-deformation mesh data) deformed by the mesh data deformation module 309.

Next, the description will be given with reference to a flowchart of FIG. 24 about a processing procedure of the image processing device 1400 according to this embodiment.

First, the 3D model acquisition module 301 acquires the 3D model (before-deformation 3D model) of the subject 402 of the first state based on the depth image of the subject 402 of the first state which is output from the first image capture unit 100 (Step S41). The before-deformation 3D model acquired in Step S41 is, for example, a model showing the subject 402 facing in the substantially front direction.

Next, the captured clothing image acquisition module 1401 acquires the first captured clothing image which is output from the second image capture unit 200. The first captured clothing image is an image containing the subject 402 wearing the clothing 403 in the same state (that is, the first state) as that at the time of capturing of the first image capture unit 100. In other words, the first captured clothing image is, for example, an image containing the subject 402 which wears the clothing 403 and faces in the substantially front direction.

In addition, the captured clothing image acquisition module 1401 acquires the second captured clothing image containing the subject 402 wearing the clothing 403 in a state (that is, the second state) different from the first state in addition to the first captured clothing image. The second captured clothing image is, for example, an image containing the subject 402 which wears the clothing 403 and faces in a direction (angle) rotated by about 10 degrees from the substantially front direction.

In other words, the captured clothing image acquisition module 1401 acquires the first captured clothing image containing the subject 402 wearing the clothing 403 of the first state and the second captured clothing image containing the subject 402 wearing the clothing 403 of the second state (Step S42).

The first and second captured clothing images may be acquired such that the second image capture unit 200 captures the subject 402 while manually rotating the turntable 401, or may be acquired by controlling the second image capture unit 200 to automatically capture the subject 402 placed on the turntable 401 which is automatically rotated according to a rotation angle.

Hereinafter, the processes of Steps S43 to S49 corresponding to the processes of Steps S3 to S9 illustrated in FIG. 4 are performed.

Herein, the after-deformation 3D model acquired in Step S47 is assumed as a model showing the subject 402 (that is, the subject 402 of the second state) facing in a direction rotated by about 10 degrees from the substantially front direction.

In this case, the mesh data (after-deformation mesh data) deformed in Step S49 is assumed as data indicating a region corresponding to the region of the clothing 403 worn by the subject 402 of the second state contained in the second captured clothing image.

Therefore, the clothing image generator 1402 can cut the region of the clothing 403 from the second captured clothing image by applying the after-deformation mesh data (mask image) to the second captured clothing image (that is, performing the mask process) (Step S50). Then, the clothing image generator 1402 generates the clothing image.

When the process of Step S50 is performed, the processes of Steps S51 to S53 corresponding to the processes of Steps S11 to S13 illustrated in FIG. 4 are performed. Further, in a case where it is determined in Step S52 that the change of the control point is commanded, the procedure returns to Step S46 and the process is repeatedly performed after the control point is changed according to an operation of the manager for example.

As described above, in this embodiment, the clothing image is generated by applying the mesh data (after-deformation mesh data) deformed similarly to the first embodiment to the second captured clothing image containing the subject 402 wearing the clothing 403 of the second state.

Herein, since the clothing image is generated by adding the corresponding color to each of the plurality of vertexes of the after-deformation mesh data in the first embodiment, the color (and shape) of the clothing 403 in the clothing image may become different from the actual clothing 403. With this regard, since the region (portion) of the clothing 403 is possible to be cut out of the second captured clothing image in this embodiment, the clothing image can be generated with a higher accuracy compared to the clothing image in the first embodiment.

Further, in this embodiment, it is possible to easily generate the clothing image corresponding to various angles (directions) by continuously capturing (acquiring) the captured clothing image at various rotation angles while automatically rotating the turntable 401 where the subject 402 is placed as described above. Similarly, if the captured clothing image containing the subject 402 of a different posture or body type is captured, it is possible to generate the clothing image corresponding to the posture or body type.

In addition, in this embodiment, the region of the clothing 403 in the second captured clothing image may be not completely matched with the region of the clothing 403 represented by the after-deformation mesh data. Therefore, the boundary portions of the after-deformation mesh data (that is, the mask image) may be configured to have a permeability in multiple stages (for example, 0 to 255). According to this configuration, even when an error occurs between the region of the clothing 403 in the second captured clothing image and the region of the clothing 403 represented by the after-deformation mesh data, the influence of the error can be alleviated.

Fourth Embodiment

Figure 25:
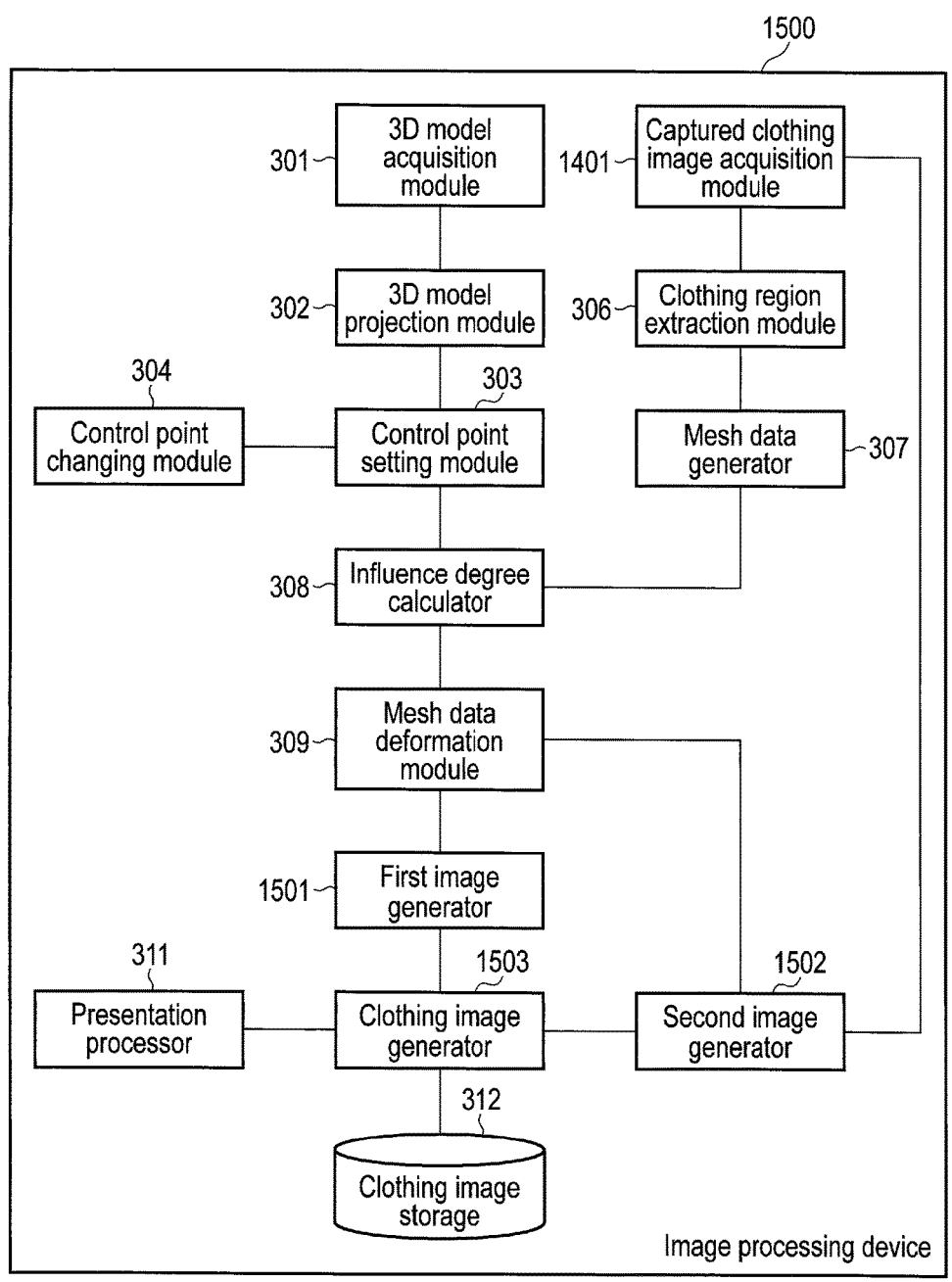
FIG. 25 is a block diagram illustrating a functional configuration of an image processing device according to a fourth embodiment.

Next, a fourth embodiment will be described. FIG. 25 is a block diagram illustrating a functional configuration of an image processing device according to this embodiment. Further, the same portions as those of FIGS. 3 and 23 will be attached with the same symbols, and the description thereof will be omitted. Herein, the description will be focused on the portions different from those of FIGS. 3 and 23.

In addition, the configuration of an image processing system equipped with the image processing device according to this embodiment is similar to that of the first embodiment, and thus will be roughly described using FIGS. 1 and 2.

This embodiment is different from the above embodiments in that the first embodiment and the third embodiment are combined.

As illustrated in FIG. 25, an image processing device 1500 according to this embodiment includes a first image generator 1501, a second image generator 1502, and a clothing image generator 1503.

In this embodiment, it is assumed that some or all of these modules 1501 to 1503 may be realized by executing a program (that is, software) on at least one processor equipped in the image processing device 1500 for example. Further, some or all of the respective modules 1501 to 1503 may be realized by hardware equipped in the image processing device 1500, or may be realized by combination of hardware and software.

The first image generator 1501 corresponds to the clothing image generator 310 described in the first embodiment, and generates the image (hereinafter, referred to as first image) of the clothing 403 by adding the corresponding color to each of the plurality of vertexes of the after-deformation mesh data. Further, the corresponding color to each of the plurality of vertexes of the after-deformation mesh data can be specified from the captured clothing image (first captured clothing image).

The second image generator 1502 corresponds to the clothing image generator 1402 described in the third embodiment, and generates the image (hereinafter, referred to as second image) of the clothing 403 by applying the after-deformation mesh data to a second captured clothing image.

The clothing image generator 1503 generates the clothing image using the first image generated by the first image generator 1501 and the second image generated by the second image generator 1502.

Figure 26:
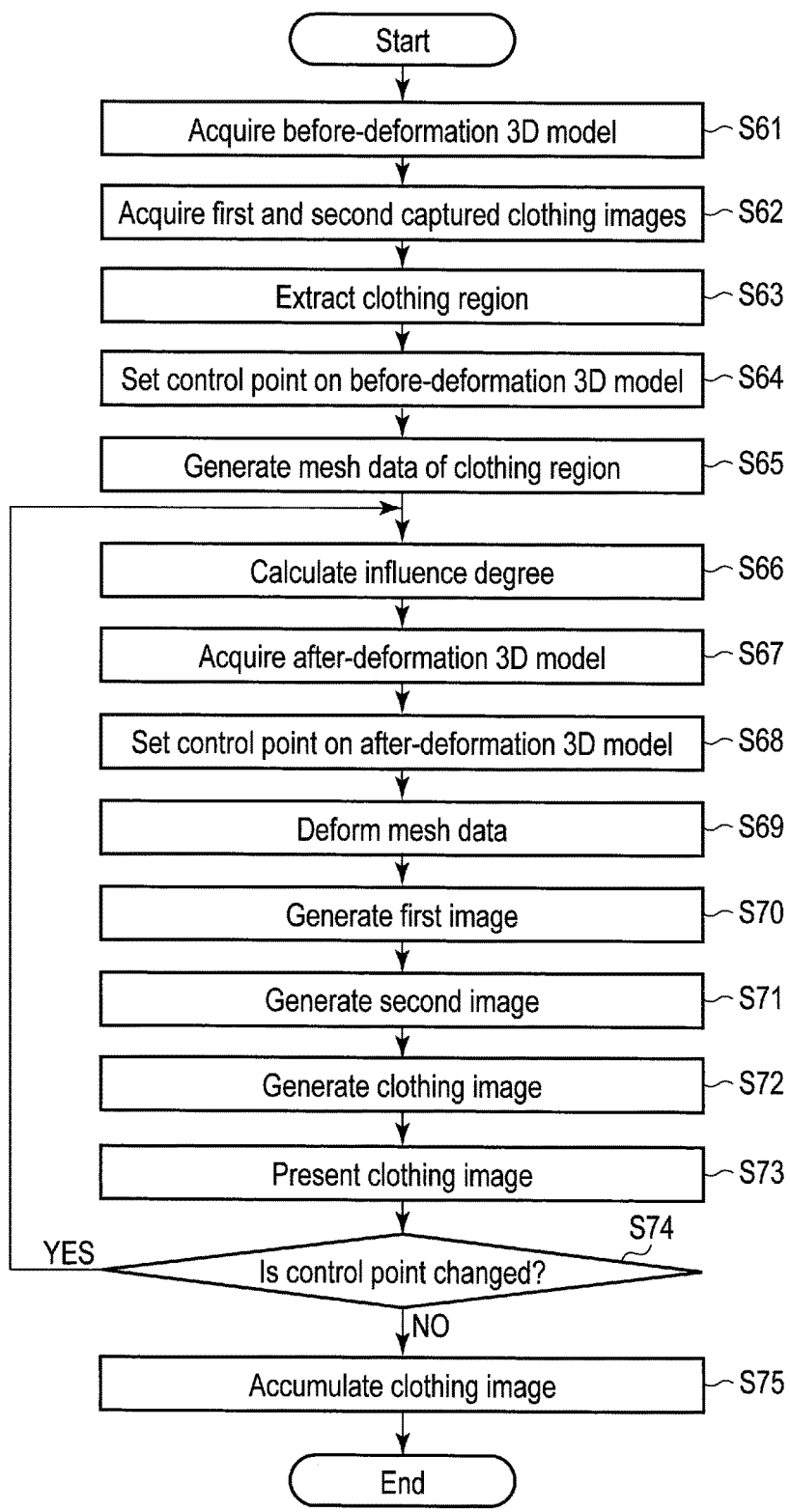
FIG. 26 is a flowchart illustrating an exemplary processing procedure of the image processing device.

Next, the description will be given with reference to a flowchart of FIG. 26 about a processing procedure of the image processing device 1500 according to this embodiment.

First, the processes of Steps S61 to S69 corresponding to the processes of Steps S41 to S49 illustrated in FIG. 24 are performed.

Next, the first image generator 1501 generates the first image using the first captured clothing image and the after-deformation mesh data (Step S70). Further, the first image generator 1501 generates the first image by performing the same process as that of Step S10 illustrated in FIG. 4.

In addition, the second image generator 1502 generates the second image using the second captured clothing image and the after-deformation mesh data (Step S71). Further, the second image generator 1502 generates the second image by performing the same process as that of Step S50 illustrated in FIG. 24.

Next, the clothing image generator 1503 generates the clothing image by mixing the first image generated by the first image generator 1501 and the second image generated by the second image generator 1502 (Step S72).

Herein, the clothing image (that is, the first image) generated by the process illustrated in the first embodiment is an image generated by giving the corresponding color to the after-deformation mesh data (each of the plurality of vertexes). While a background region is not contained in the image, the color of the clothing 403 in the image may be different from the actual color of the clothing 403 as described above.

On the other hand, the clothing image (that is, the second image) generated by the process described in the third embodiment is an image generated by cutting the region of the clothing 403 from the second captured clothing image. Therefore, the color of the clothing 403 in the image has a high accuracy. However, in a case where the region of the clothing 403 in the second captured clothing image and the region of the clothing 403 represented by the after-deformation mesh data are not completely matched to each other, the region of the clothing 403 in the second captured clothing image may be scraped, or the background region may be included in the clothing image.

Figure 27:
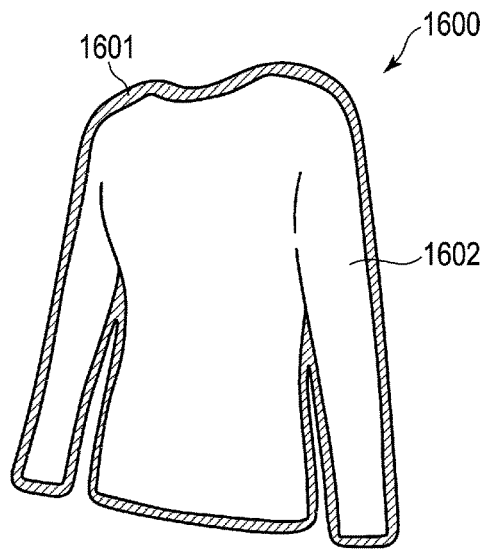
FIG. 27 is a diagram for describing an example of the clothing image which is generated in this embodiment.

Therefore, in this embodiment, as illustrated in FIG. 27, the clothing image is generated such that the first image is applied to a region (hereinafter, referred to as first region) 1601 near the contour, and the second image is applied to a region (hereinafter, referred to as second region) 1602 other than the region 1601.

Further, the first region may be defined as a region of a width as many as certain pixels in an inward direction from the contour of the clothing 403 in the first image.

When the process of Step S72 is performed, the processes of Steps S73 to S75 corresponding to the processes of Steps S11 to S13 (Steps S51 to S53 illustrated in FIG. 23) illustrated in FIG. 4 are performed. Further, in a case where it is determined in Step S74 that the change of the control point is commanded, the procedure returns to Step S66 and the process is repeatedly performed after the control point is changed according to an operation of the manager.

In this embodiment as described above, the clothing image is generated by mixing the first image generated by the process described in the first embodiment and the second image generated by the process described in the third embodiment. With such a configuration of this embodiment, it is possible to generate the clothing image with a high accuracy on color without containing the background region.

Figure 28:
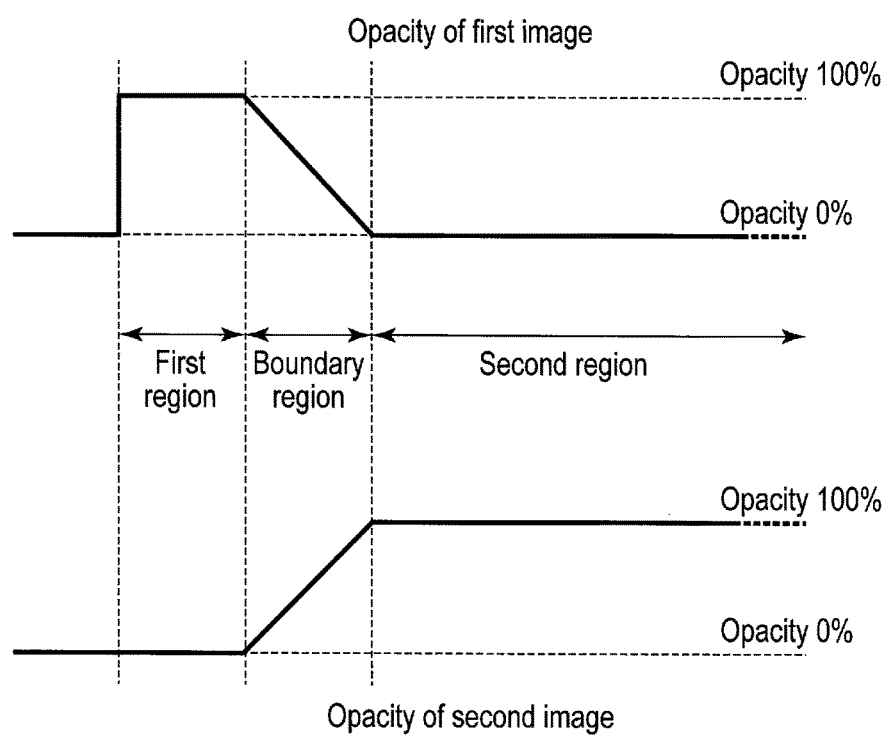
FIG. 28 is a diagram for describing an example of opacities of a first image and a second image in the boundary region.

Further, since the clothing image is generated by using different images (that is, the first image and the second image) for the first region and the second region in this embodiment, the first region and the second region is separated from each other so that the clothing image may be shown unnaturally. Therefore, in this embodiment, the boundary between the images may be smoothened by changing opacities (or transparencies) of the first and second images in the boundary region between the first region and the second region as illustrated in FIG. 28.

According to at least one of the embodiments described above, it is possible to provide the image processing device, the image processing system, the image processing method, and the program through which the image of the clothing for the virtual try-on can be easily generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising at least one processor configured to:
   acquire a first three-dimensional model regarding a subject;
   set a plurality of first control points on the first three-dimensional model;
   acquire mesh data of a mesh image of a region of clothing extracted from a captured image including the subject wearing the clothing, the acquired mesh data comprising a plurality of vertexes;
   acquire a plurality of second three-dimensional models by modifying a direction, a posture, and/or a body type of the first three-dimensional model;
   generate modified mesh data for each respective one of the plurality of second three-dimensional models based on an amount of movement from each of the plurality of first control points set on the first three-dimensional model, to each respective one of a plurality of second control points, respectively corresponding to the plurality of first control points, on the respective one of the plurality of second three-dimensional models; and
   generate a plurality of images of the clothing using the captured image and the modified mesh data, wherein
   the at least one processor is configured to:
   calculate, as an influence degree for each of a plurality of respective first control point-vertex combinations, a distance between the first control point and the vertex of the respective combination in a total region of a region of the first three-dimensional model and a region of the clothing represented by the mesh data in a case in which the modified mesh data is superimposed on the first three-dimensional model to represent a state in which the subject wears the clothing; and
   acquire boundary information indicating a boundary of the region of the clothing, the boundary being designated on the region of the clothing, and each distance is based on the shortest path which does not cross the boundary indicated by the boundary information.

2. The image processing device of claim 1, wherein the mesh data is modified using the calculated influence degrees.

3. The image processing device of claim 1, wherein the plurality of first control points set on the first three-dimensional model comprises a physical feature point in the first three-dimensional model.

4. The image processing device of claim 1, wherein the plurality of first control points is positioned on an outer periphery of the first three-dimensional model in a case in which the first three-dimensional model is projected.

5. The image processing device of claim 1, wherein the at least one processor is configured to acquire the first three-dimensional model regarding the subject captured by an image capture unit including a camera,
   each of the plurality of first control points set on the first three-dimensional model contains depth information indicating a position of the first control point in a depth direction with respect to the image capture unit, and
   the at least one processor is configured to:
   calculate depth information corresponding to each of the plurality of vertexes of the acquired mesh data based on the depth information contained in each of the plurality of first control points set on the first three-dimensional model; and perform a hidden surface elimination process based on depth information corresponding to each of the plurality of vertexes of the modified mesh data when the plurality of images of the clothing is generated.

6. An image processing method to be executed by an image processing device, comprising:

acquiring a first three-dimensional model regarding a subject;

setting a plurality of first control points on the acquired first three-dimensional model;

acquiring mesh data of a mesh image of a region of clothing extracted from a captured image including the subject wearing the clothing, the acquired mesh data comprising a plurality of vertexes;

acquiring a plurality of second three-dimensional models by modifying a direction, a posture, and/or a body type of the first three-dimensional model;

generating modified mesh data for each respective one of the plurality of second three-dimensional models based on an amount of movement from each of the plurality of first control points set on the first three-dimensional model, to each respective one of a plurality of second control points, respectively corresponding to the plurality of first control points, on the respective one of the plurality of second three-dimensional models; and generating a plurality of images of the clothing using the captured image and the modified mesh data, wherein the method further comprises:

calculating, as an influence degree for each of a plurality of respective first control point-vertex combinations, a distance between the first control point and the vertex of the respective combination in a total region of a region of the first three-dimensional model and a region of the clothing represented by the mesh data in a case in which the modified mesh data is superimposed on the first three-dimensional model to represent a state in which the subject wears the clothing; and acquiring boundary information indicating a boundary of the region of the clothing, the boundary being designated on the region of the clothing, and each distance is based on the shortest path which does not cross the boundary indicated by the boundary information.

7. The image processing method of claim 6, wherein the mesh data is modified using the calculated influence degrees.

8. The image processing method of claim 6, wherein the plurality of first control points set on the first three-dimensional model comprises a physical feature point in the first three-dimensional model.

9. The image processing method of claim 6, wherein the plurality of first control points are positioned on an outer periphery of the first three-dimensional model in a case in which the first three-dimensional model is projected.

10. The image processing method of claim 6, further comprising:

calculating depth information, wherein the acquiring of the first three-dimensional model comprises acquiring the first three-dimensional model regarding the subject captured by an image capture unit including a camera, each of the plurality of first control points set on the first three-dimensional model comprises depth information indicating a position of the first control point in a depth direction with respect to the image capture unit, and the calculating of the depth information comprises calculating depth information corresponding to each of the plurality of vertexes of the acquired mesh data based on the depth information contained in each of the plurality of first control points set on the first three-dimensional model, and the generating comprises performing a hidden surface elimination process based on depth information corresponding to each of the plurality of vertexes of the modified mesh data when the plurality of images of the clothing is generated.

* * * * *